United States Patent
Takayasu

[11] Patent Number: 6,074,764
[45] Date of Patent: *Jun. 13, 2000

[54] CLAD MATERIAL

[75] Inventor: Akira Takayasu, Aichi, Japan

[73] Assignee: Showa Entetsu Co., Ltd., Aichi, Japan

[ * ] Notice: This patent is subject to a terminal disclaimer.

[21] Appl. No.: 08/981,686

[22] PCT Filed: Jul. 4, 1996

[86] PCT No.: PCT/JP96/01849

§ 371 Date: May 7, 1998

§ 102(e) Date: May 7, 1998

[87] PCT Pub. No.: WO97/02137

PCT Pub. Date: Jan. 23, 1997

[30] Foreign Application Priority Data

Jul. 6, 1995 [JP] Japan ................................... 7-194225

[51] Int. Cl.[7] .............................. B32B 3/24; B32B 15/00
[52] U.S. Cl. ...................... 428/594; 428/609; 428/614; 428/661
[58] Field of Search ..................... 428/614, 596, 428/615, 594, 609, 661, 660, 685, 677, 675, 674, 679, 683, 662; 228/235.2, 235.3, 190

[56] References Cited

U.S. PATENT DOCUMENTS

| | | | |
|---|---|---|---|
| 587,493 | 8/1897 | Sargent | 428/614 |
| 664,438 | 12/1900 | Sargent | 428/614 |
| 1,184,137 | 5/1916 | Sargent | 428/614 |
| 2,694,852 | 11/1954 | Rogers | 29/195 |
| 3,002,834 | 10/1961 | Pasquale | 428/614 |
| 3,406,446 | 10/1968 | Muldovan | 428/614 |
| 4,262,412 | 4/1981 | McDonald | 428/614 |
| 5,069,978 | 12/1991 | Mizuhara | 428/621 |
| 5,506,062 | 4/1996 | Flammang | 428/614 |
| 5,874,178 | 2/1999 | Takayasu | 428/681 |

FOREIGN PATENT DOCUMENTS

| | | |
|---|---|---|
| 0027145A1 | 10/1980 | European Pat. Off. ........ B23K 20/00 |
| 0217685 | 4/1987 | European Pat. Off. ........ B23K 35/00 |
| 56-22422 | 5/1981 | Japan . |
| 57-24459 | 5/1982 | Japan . |
| 60-38269 | 8/1985 | Japan . |
| 61-7155 | 3/1986 | Japan . |
| 63-149090 | 6/1988 | Japan . |
| 3-62511 | 9/1991 | Japan . |

Primary Examiner—John J. Zimmerman
Attorney, Agent, or Firm—Snider & Associates; Ronald R. Snider

[57] ABSTRACT

The cladding material 10 comprises a metal substrate 1, an expanded metal mesh 3 placed on the metal substrate 1 and a corrosion resistant metal lining 4 is placed in contact with the metal mesh 3 in opposition to the metal substrate 1 with the metal mesh 3 inbetween. A metal mesh layer placed on said metal substrate 1 may comprise an expanded metal whose openings are formed by making staggered cuts in a metal plate over the whole part thereof so that each cut passes through the thickness of said metal plate, and expanding said metal plate in a direction intersecting the length of said cuts thereby opening each cut.

16 Claims, 23 Drawing Sheets

(a)

(b)

(a)

(b)

(a)

(b)

(c)

(a)

(b)

(c)

(a)

(b)

(a)

(b)

(c)

(a)

(b)

(a)

(b)

(a)

(b)

(a)

(b)

(a)

(b)

(c)

(d)

(a)

(b)

(c)

500. 
CLAD MATERIAL

FIELD OF INVENTION

This invention relates to a cladding material wherein a corrosion resistant metal lining is seam-welded on a metal substrate.

BACKGROUND OF INVENTION

In a conventional method for manufacturing a cladding material, a corrosion resistant metal lining (such as Ti (titanium) or Zr (zirconium)) is bonded to an Fe (iron)-based, a Cu (copper)-based or Al (aluminum)-based metal substrate by a seem welding method. For example, it has been proposed various seem-welding techniques for manufacturing such cladding materials such that a Cu thin plate and a stainless steel mesh are inserted between the Fe-based metal substrate and a corrosion resistant metal lining, and the laminate thereof are integrated by seem welding (Japanese Utility Model Publication No.24459 of 1982), that a Cu mesh, a stainless steel mesh and a corrosion resistant metal lining are laminated on a Pb—Sn solder-coated Cu substrate and integrated each other by seem welding (Japanese Patent Publication No.22422 of 1981), and that a stainless steel mesh are inserted between the Al-based metal substrate and a corrosion resistant metal lining, and the laminate thereof are integrated by seem welding (Japanese Patent Publications No.38269 of 1985 and No.7155 of 1986).

However, all in these prior arts, a conventional metal mesh which is produced by knitting two sets of metal wires has been used. Such mesh is expensive since the manufacturing process thereof comprises many steps such as wire drawing and knitting.

The object of this invention is to offer a cladding material which has an excellent bonding strength and can be produced at a cheaper cost by using a metal mesh produced according to a simple manufacturing process.

SUMMARY OF THE INVENTION

For accomplishing the object mentioned above, the cladding material according to claim 1 has the following constitution. a metal substrate, a metal mesh layer placed on said metal substrate comprising an expanded metal mesh whose openings are formed by making staggered cuts in a metal plate over the whole part thereof so that each cut passes through the thickness of said metal plate, and expanding said metal plate in a direction intersecting the length of said cuts thereby opening each cut, and a metal lining which is placed in contact with said metal mesh in opposition to said metal substrate with said metal mesh inbetween. The metal substrate, the metal mesh layer and the corrosion resistant metal lining are bonded together.

In such cladding material, the metal substrate and the metal lining are strongly bonded together through the metal mesh layer, and the expanded metal used for the metal mesh layer is easy to manufacture and may contribute to a cost reduction of manufacturing the cladding material.

The expanded metal may be prepared more specifically by a method that the portions on both sides of each cut of the metal plate is deformed along the thickness thereof in opposite direction each other for opening each cut. A rolling may be performed against the expanded metal obtained.

The cladding material can be constructed so as to comprise a resistance welded zone which bonds the metal substrate, the metal mesh layer and the metal lining together.

The resistance welding zone can be formed by a seam welding method, a spot welding method or other resistance welding method. The seam welding method is particularly preferable for this invention. More specifically, the metal mesh layer and that metal lining are laminated on the metal substrate in this order. Roller electrodes are urged to the laminate with a designated pressure and send electric current thereto for resistance heating. Then, the roller electrodes are relatively rolled on the laminate for forming seam welded zone. The electric current may be sent into the laminate by using a plurality of roller electrodes which pinch the laminate therebetween. On the other hand, a method without pinching the laminate between the roller electrodes, such as series seam welding, is also available. In the series seam welding process, a roller electrode is arranged on the metal lining, and the other electrode is arranged on the same side. Electric current is sent into the laminate along a path starting from one electrode, passing through the laminate across the thickness thereof, turning sideward along the laminating plane, then reaching to the other electrode with passing through the laminate again in the opposite direction. As the electric current, both alternating current and direct current are available for this invention.

The metal mesh has a small cross section for the current path because of a number of opening formed therein, so that the temperature raises around the metal mesh due to the large resistance heat generated therefrom. Thus, the heated metal mesh layer is to be intruded into at least one of the metal lining and the metal substrate, which are softened due to the resistance heating, under a pressure from the roller electrodes. The bonding force appears to be increased according to such intrusion effect of the metal mesh layer.

By using a metal mesh consisting of a material harder than the metal lining around the welding temperature, the bonding strength may improve since the intrusion effect of the metal mesh against the metal lining is enhanced. The bonding force may be increased also by adjusting the generation of the resistance heat so that the metal lining is softened moderately by the heat generation from the metal mesh itself or from the contacting part thereof, since the intrusion of the metal mesh into the metal lining is promoted significantly. Furthermore, the bonding strength may improve by choosing materials having an excellent affinity with each other for the metal mesh and the metal lining, respectively. In this case the meaning of "having an excellent affinity with each other" is that each material has a good interdiffusivity around the welding temperature, or has an excellent wettability against the liquid phase generated by their own partial melting. In the case that the liquid phase generated by partial melting of the metal mesh consisting of such material exhibits an excellent wettability for the metal lining consisting of the materials mentioned above, a good bonding state may be achieved due to a kind of a brazing and soldering effect even if no intrusion occurs between the metal mesh layer and the metal lining and/or between the metal mesh layer and the metal substrate. A specific example of such construction comprises a metal lining consists of a metal whose main component is selected from Nb, Ta and Ni and a metal mesh layer consists of a metal whose main component is selected from Ni and Cu.

The metal substrate, the metal mesh layer and the corrosion resistant metal lining can be bonded together by other methods except for a resistance welding method, such as explosion bonding wherein the metal lining, the metal mesh layer and the metal substrate are overlapped and bonded by a charge of explosive powder placed thereon, a rolling process wherein the metal lining, the metal mesh layer and the metal substrate are overlapped and rolled between a roller couple, and wherein in some case the rolled laminate is heat treated for the component diffusion.

The metal plate used for the expanded metal can be a cladding material consisting of two or more metal sheets laminated each other. In the case of using a two layered cladding material for the metal plate, a high bonding strength between the metal lining and the metal substrate can be achieved by using a cladding material one of the layers of which consists of a material having a high affinity or an intrusion effect for the metal lining and the other of which consists of a material having a high affinity.

In the case of using a mesh consisting of a single material, the electric resistivity thereof is sometimes too high, and the heat generation from the mesh becomes excess. This may cause melting down of the metal mesh or too much softening of the metal lining or the metal substrate. In the latter case, the whole part of the metal mesh may be buried into the lining, and the bonding force between the metal lining and the metal substrate decreases since the intrusion of the metal mesh becomes insufficient. Such problem can be dissolved by adjusting the total electric resistivity of the expanded metal produced from a cladding material consisting of two materials of different electric resistivities, whereby excellent bonding state is to be achieved.

The metal mesh layer can comprise two or more metal meshes at least one of which is said expanded metal mesh. In this case, the metal mesh layer can comprise a metal mesh comprising first metal wires which extend along a designated direction and are arranged almost parallel to each other, and second metal wires which extend along a direction intersecting with said designated direction and are arranged almost parallel to each other. Furthermore, the metal mesh layer can comprise plural meshes all of which consist of different materials each other or can comprise a plural meshes at least a part of which consist of the same material.

In the cladding material described above, an intermediate metal layer can be inserted between the metal substrate and the metal mesh layer.

The metal substrate can be constructed so as to consist of a metal whose main component is the one selected from Fe, Cu and Al. The metal mesh layer can comprise the expanded metal layer consisting of a metal whose main component is the one selected from Fe, Ni, Cu, Ag, Ti and Zr. The metal lining can be constructed as a corrosion resistant metal lining consisting of a metal whose main component is the one selected from Ti, Zr, Nb, Ta and Ni, or consisting of a stainless steel.

One of more specific construction of the cladding material comprises the metal substrate consisting of Cu or Cu alloy, the metal mesh layer comprising the expanded metal consisting of Ti or Ti alloy (Ti-based mesh, hereinafter), the intermediate metal layer consisting of a metal whose melting point is lower than the metal used for the metal substrate and the corrosion resistant metal lining consisting of a metal whose main component is the one selected from Ti, Zr, Nb, Ta and Ni, or consisting of a stainless steel, and placed in contact with said metal mesh layer in opposition to said intermediate metal layer with said metal mesh layer inbetween.

In the construction mentioned above, the bonding strength of the cladding material becomes more excellent when the metal mesh layer is constructed so that a Cu-based metal mesh, whose main component is Cu, is located adjacent to the metal lining, and said Ti-based mesh is located on the intermediate metal layer. In this configuration, the enhanced bonding strength appears to be due to the bonding mechanism such that a liquid phase attributed to the melting of the intermediate metal layer is supplied into the opening of the Cu-based mesh through the opening of the Ti-based mesh thereby bonding the Cu-based mesh with metal substrate, while the Ti-based mesh intrudes into or welded to the metal lining through the opening of the Cu-based metal. Particularly in the case of the metal lining consists of Ti, Zr or the alloys thereof, the component diffusion between the Ti-based mesh and the metal lining occurs extensively, so that the bonding strength may be further enhanced. The metal mesh layer can be constructed as a three layered one, which comprise a Ti-based mesh and Cu-based meshes placed on both sides of the Ti-based one.

The intermediate metal layer can be constituted of a material containing more than 50 wt % of at least one of components selected from Pb (lead), Sn (tin) and Zn (zinc) in total. In this case, for adjusting the melting point or the strength of the intermediate metal layer, it is preferable to add at least one component selected from In (indium), Ga (gallium), Ag and Cu to the alloy used for the intermediate layer. Besides the alloys described above, following alloys may be preferably used for the intermediate metal layer; an alloy containing Ag and Cu more than 50 wt % in total; an alloy containing more than 70 wt % of Cu and more than 3 wt % of P.

The cladding materials comprising an Fe-based metal substrate are preferably used for following apparatus or structures:

internal lining for distillation columns, reactors, reacting columns, chemical reservoirs, agitation vessels, high pressure gas towers, vessels, separators, tank trucks and so on;

internal lining for heat exchangers (particularly, the lining for a tube sheet thereof);

internal lining for vacuum evaporators.

The cladding materials comprising a Cu-based or Al-based metal substrate are preferably used for electrodes or bus bars for electroplating or other electrolytic treatments.

Regarding the all constitutions of the cladding materials described above, the metal lining may be bonded to not only one side of the metal substrate but also the other side thereof in the same mode as described above. In this case, the metal lining on each side of the metal substrate can be constituted of different material or in a different mode of structure.

DETAILED DESCRIPTION OF THE PREFERABLE EMBODIMENTS

Figure 1:
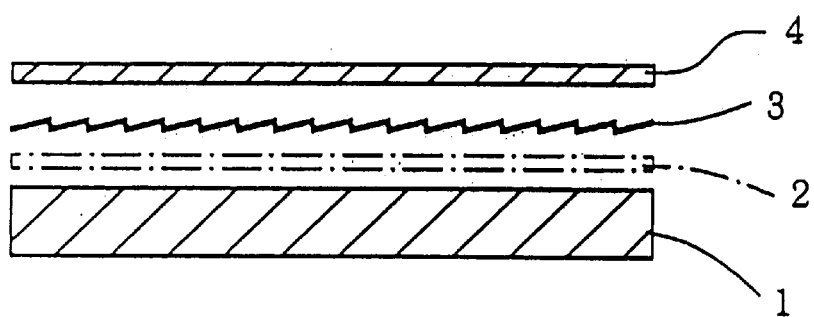
FIG. 1 is a conceptual figure showing the manufacturing process for a cladding material of this invention.
Figure 1:
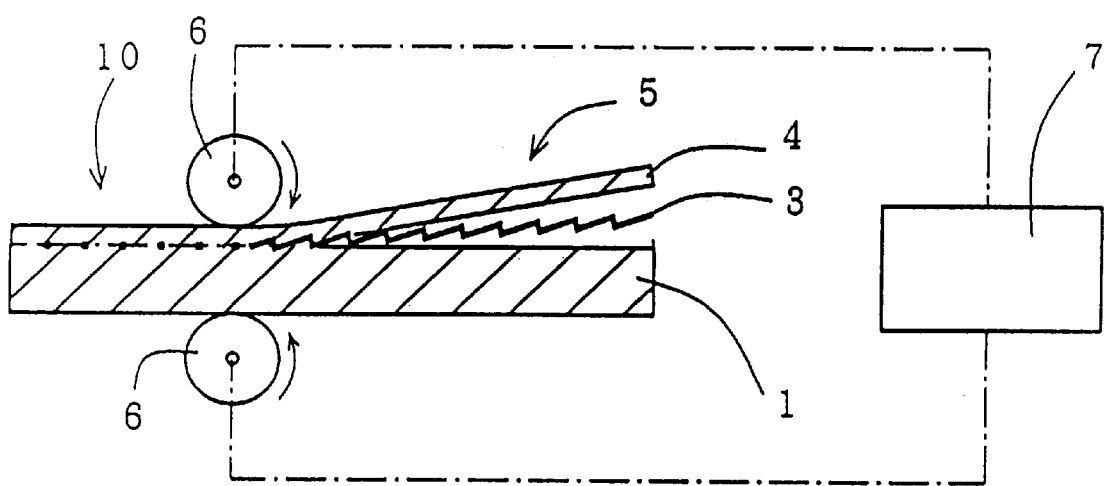

Several embodiments of this invention will now be described with reference to drawings. FIG. 1 presents the manufacturing process for the cladding material of this invention comprising an Fe-based or Al-based metal substrate. As shown in (a), a intermediate metal layer 2 as the Ni-based metal layer is placed on an Fe-based or an Al-based metal substrate ("Fe-based or Al-based substrate", hereafter) 1 consisting of such material as carbon steel or stainless steel. Furthermore, a expanded metal 3 consisting of a stainless steel and an anticorrosive metal lining ("metal lining" or "lining", hereafter) 4 consisting of anticorrosive metal, such as Ti, Zr, and so on, are placed thereon in this order. In this embodiment, the Ni-based metal foil is composed by Ni-metal though, it may be composed by a Ni-alloy.

Figure 2:
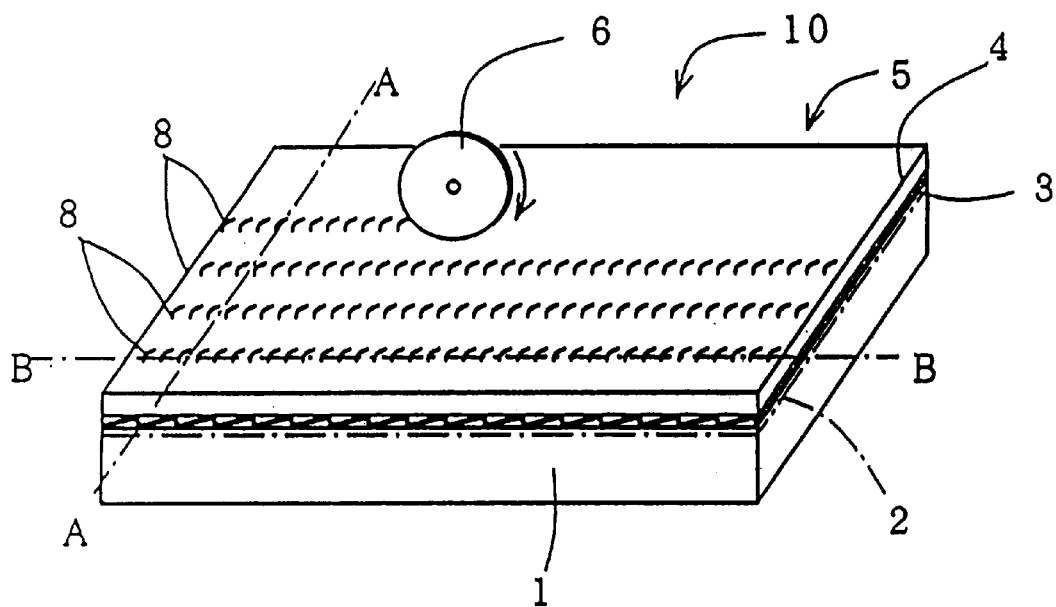
FIG. 2 is a perspective view showing the process for forming the seam welded zone.

After that, as shown in (b), the laminate 5 thereof is pinched between a pair of roller electrodes 6 in the laminating direction, and electric current is sent into the laminate 5 from the AC power supply 7 via the roller electrodes 6, while designated pressure is applied to the electrodes 6 by means of a loading means such as a pneumatic mechanism. The laminate 5 is heated thereat by the current supply as shown in FIG. 2, the electrodes 6 are relatively rolled in the direction along the surface of the laminate 5 and forms linear seam welded zone 8, whereby the metal substrate 1, Ni-based metal foil 2, the expanded metal 3 and the metal lining 4 are to be bonded together and forms a cladding material 10. The seam welded zone 8 are provided in a form of plural lines extending in the direction along the surface of the laminate 5. The electric current may be supplied to the electrodes 6 either continuously or intermittently. In the following drawings, the thickness of the Ni-based metal foil 2, the expanded metal 3 and the metal lining 4 are presented exaggeratedly in some cases, so that the thickness thereof does not always coincide with that of the practical cladding material.

Figure 25:
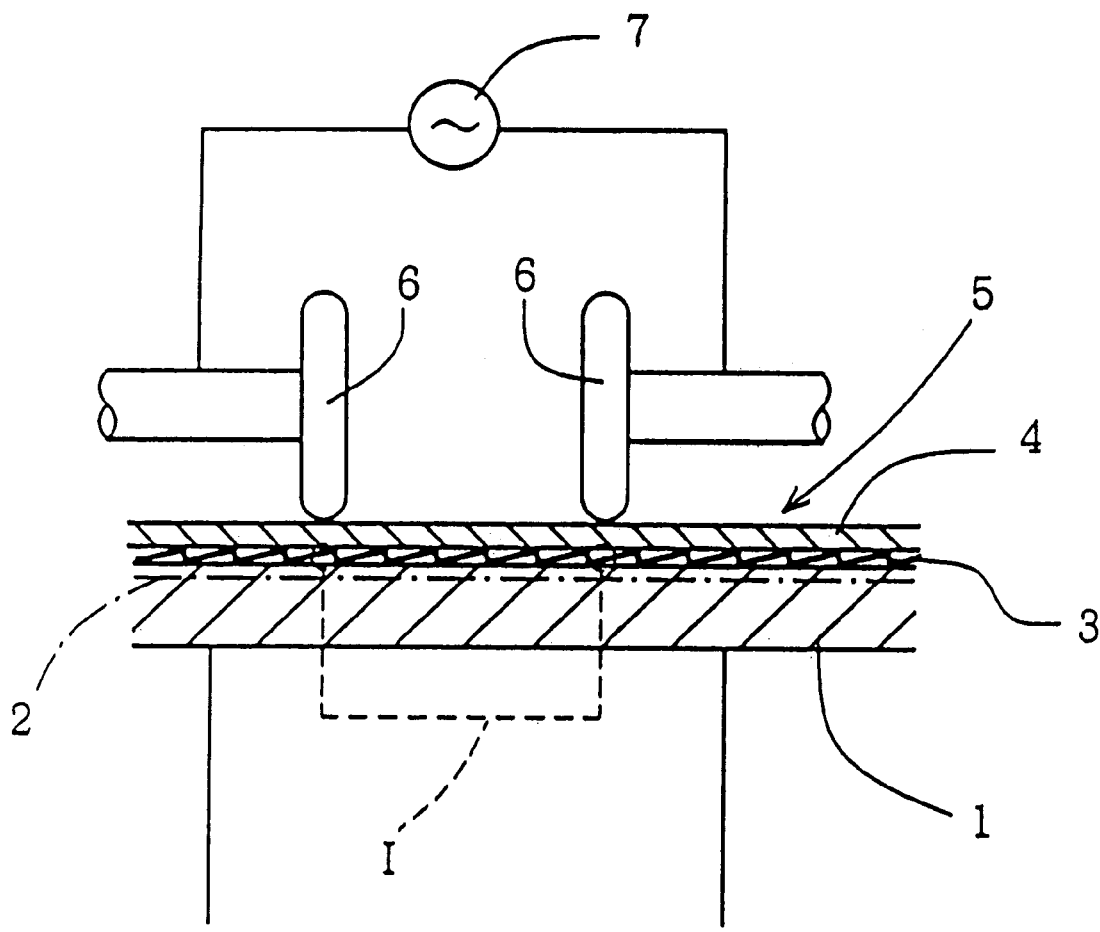
FIG. 25 is a schematic view showing the process for forming seam welded zone by using series seam welding.

As shown in FIG. 25, a method without pinching the laminate 5 between the roller electrodes 6, such as series seam welding, is also applicable. That is to say, a roller electrode 6 is arranged on the metal lining 4, and another electrode 6 is arranged on the same side. Electric current is sent into the laminate 5 along a path I starting from one electrode 6, passing through the laminate 5 across the thickness thereof, turning sideward along the laminate 5, then reaching to the other electrode 6 with passing through the laminate 5 again in the opposite direction.

Figure 26:
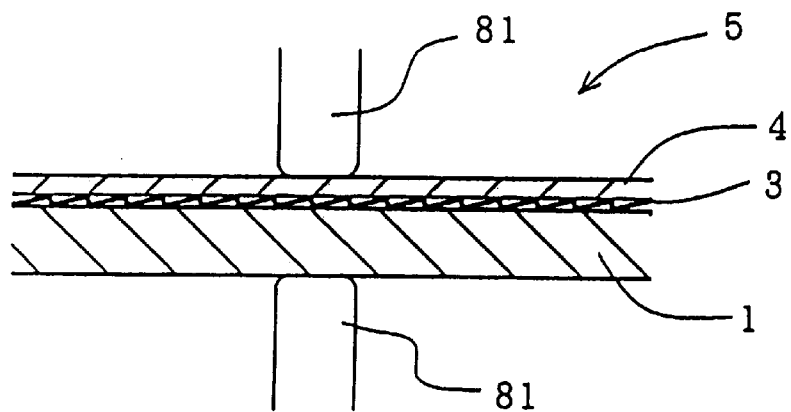
FIG. 26 is a schematic view showing the process for bonding the metal substrate, the metal mesh layer and the metal lining without using seam-welding.
Figure 26:
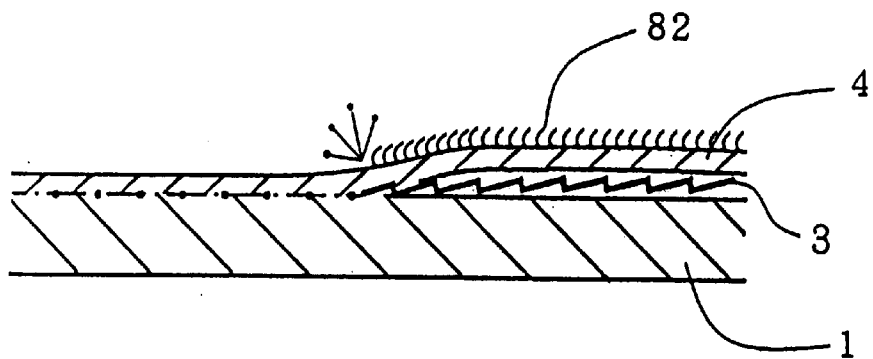
Figure 26:
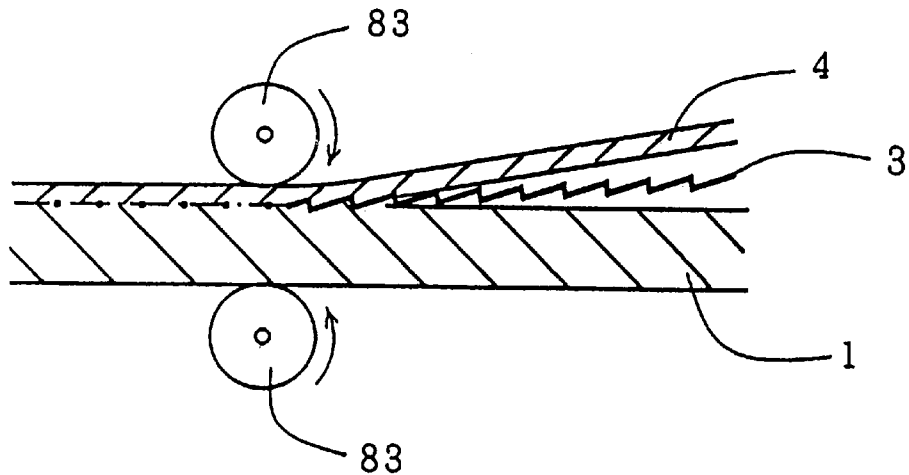

The laminates 5 can be bonded by following process without using seam welding. FIG. 26 (a) presents a spot welding method wherein the laminates 5 are pinched between electrodes 81 formed in a designated shape and resistance-heated therebetween for forming a spot-like welder zone. FIG. 26 (b) presents an explosion bonding process wherein the metal lining 4, the expanded metal 3 and the metal substrate 1 are overlapped and bonded by a charge of explosive powder 82 placed thereon. FIG. 26 (c) presents a rolling process wherein the metal lining 4, the expanded metal 3 and the metal substrate 1 are overlapped and rolled between a roller couple 83. The rolled laminate 5 can be heat treated for the component diffusion.

Figure 6:
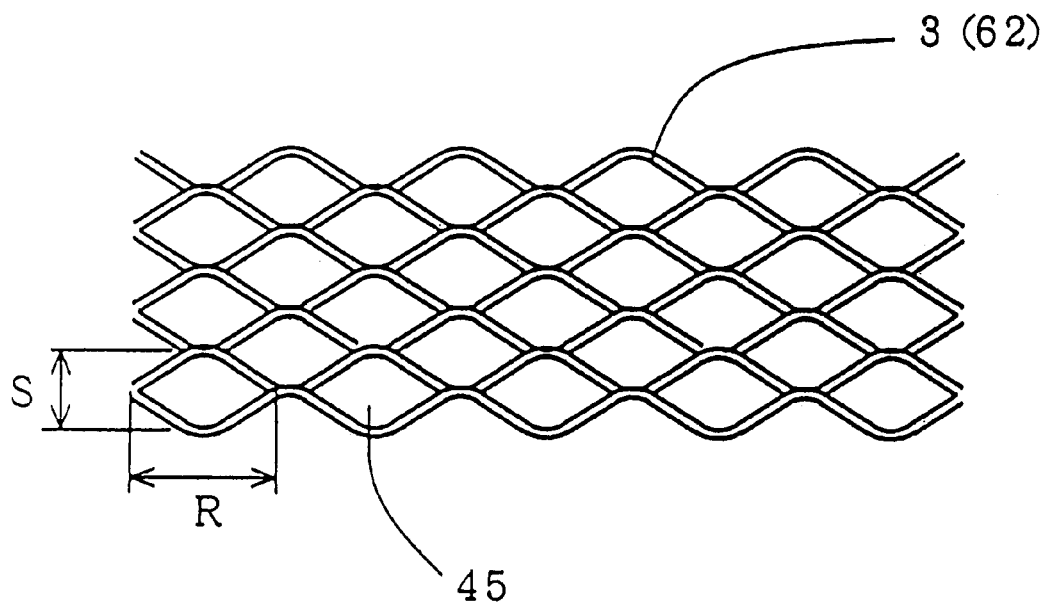
FIG. 6 is an top view of one of examples of expanded metals.
Figure 7:
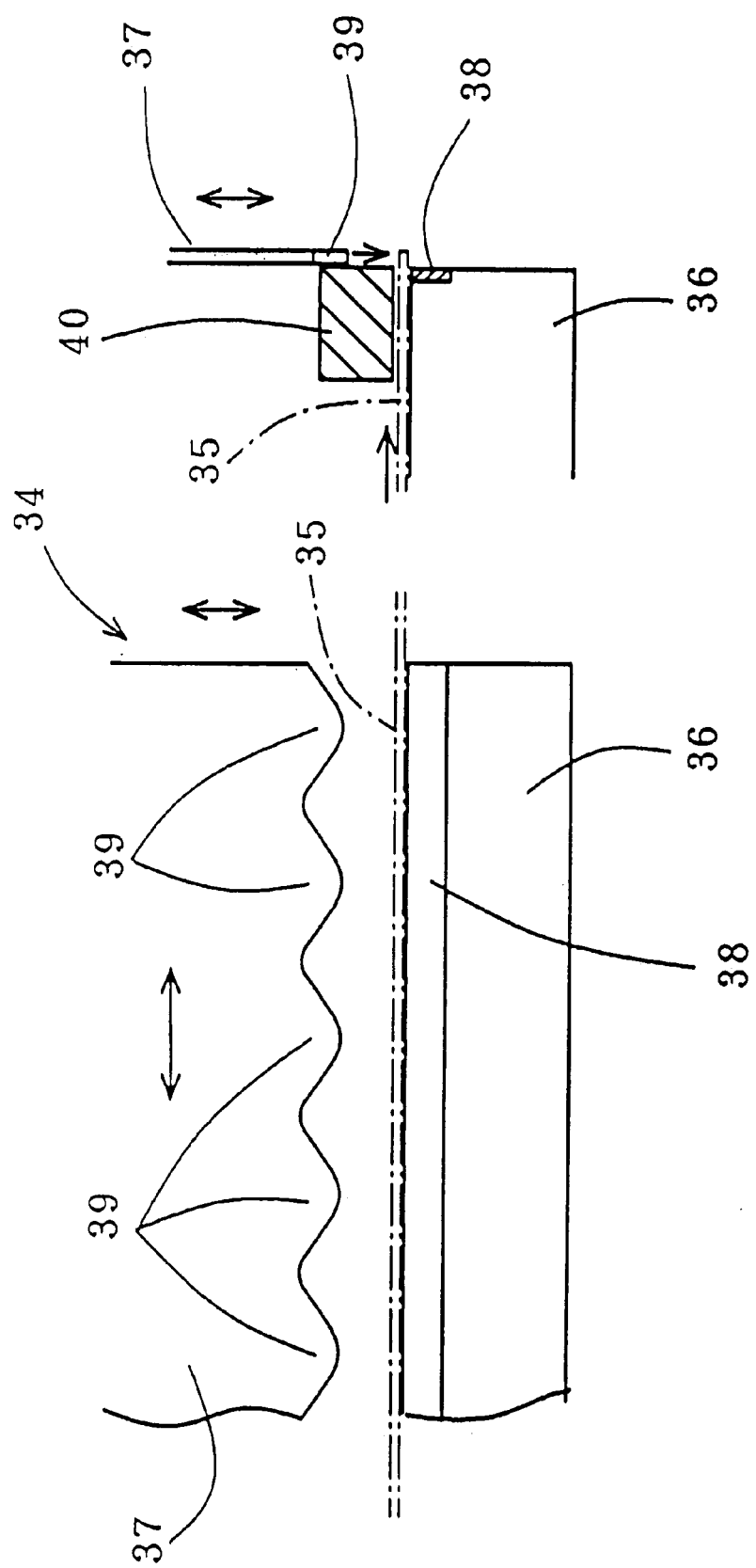
FIG. 7 is a conceptual view of an apparatus for producing an expanded metal.

The expanded metal 3 is formed in a such configuration as shown in FIG. 6, the opening of which is formed by making staggered cuts in a metal plate over the whole part thereof so that each cut passes through the thickness of the metal plate, and expanding the metal plate in a direction intersecting the length of the cuts thereby opening each cut. Such expanded metal 33 can be produced, for example, by using an apparatus 34 presented in FIG. 7.

The apparatus 34 comprises a table 36 for supporting a metal sheet (plate) 35 on the upper surface thereof, and a blade 37 mounted so as to move up and down along the end surface of the table 36. Although they are not presented in the figure, the apparatus 34 is equipped with following elements:

an elevating mechanism for moving the blade 37 up and down;

a traversing mechanism for moving the blade 37 in a transverse direction relatively against the metal plate 35 on the table 36;

a sheet feeding mechanism for feeding the metal sheet 35 on the table 36 intermittently at a designated pitch toward the end surface of the table 36 to which the blade 37 corresponds.

In the lower portion of the blade 37, a plurality of elementary blades 39 are formed in a wave-like shape. On the other hand, a linear blade 38 is formed along the upper edge of the table 36 corresponding to the elementary blades 39. 40 is a holding plate for inhibiting the metal sheet 35 rising up from the surface of the table 36.

Figure 8:
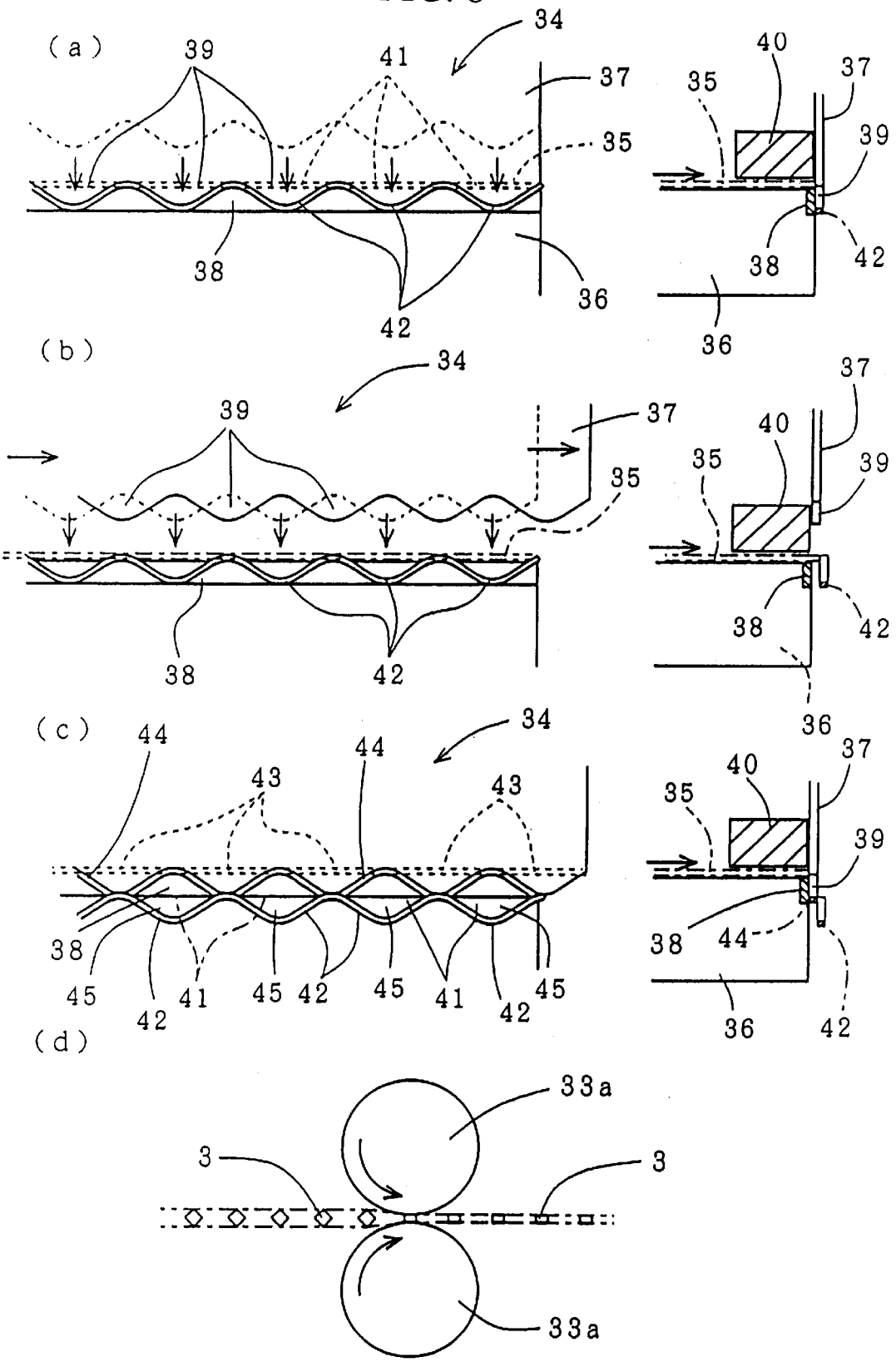
FIG. 8 is a schematic view showing the manufacturing process of an expanded metal.

The operation of the apparatus 34 is described in the following. As shown in FIG. 8 (*a*), the metal sheet 35 is projected for one pitch from the end of the table 36, and then the blade 37 is moved down. The metal sheet 35 is sheared between the blade 38 and the blade 39 in the thickness direction, and a plurality of cuts 41 are formed corresponding to the elementary blades 39 in a shape of a broken-line, while the projected part 42 of the metal sheet 35 divided by the cuts 41 is pressed down by the blade 39, thereby deforming downward and opening each cut 41.

After that, as shown in FIG. 8 (*b*), the blade 37 is lifted up and traversed along the width of the table 36 with a distance equivalent to the half of the length of each cut 41, while the metal sheet 35 is projected for one more pitch from the end of the table 36. Then, the blade 37 is moved down again and forms another series of cuts 43 almost parallel to the cuts 41 at the position shifted half of the length of each cut 41 (i.e., staggeredly), pressing down the projected part 44 of the metal sheet 35. Thus, as shown in FIG. 8 (*c*), a series of rhombic mesh opening 45 are formed in the direction of the width of the table 36 between the projected part 44 and 42. Then, the blade 37 is lifted again and moved back to the original position by traversing along the width of the table 36 in the opposite direction, whereby the apparatus 34 returns to the state of FIG. 8 (*a*). By repeating the process described above, an expanded metal 33 as shown in FIG. 6 is to be produced. Furthermore, a rolling may be performed against the obtained expanded metal 33 by using rolls 33a as shown in FIG. 8 (*d*).

Figure 3:
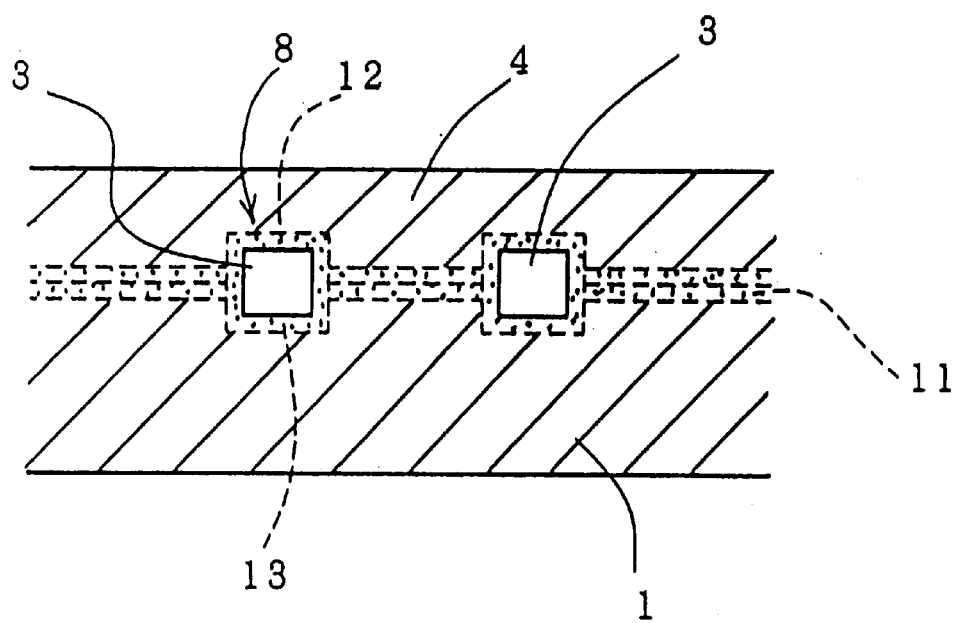
FIG. 3 is a B—B sectional view of FIG. 2.
Figure 4:
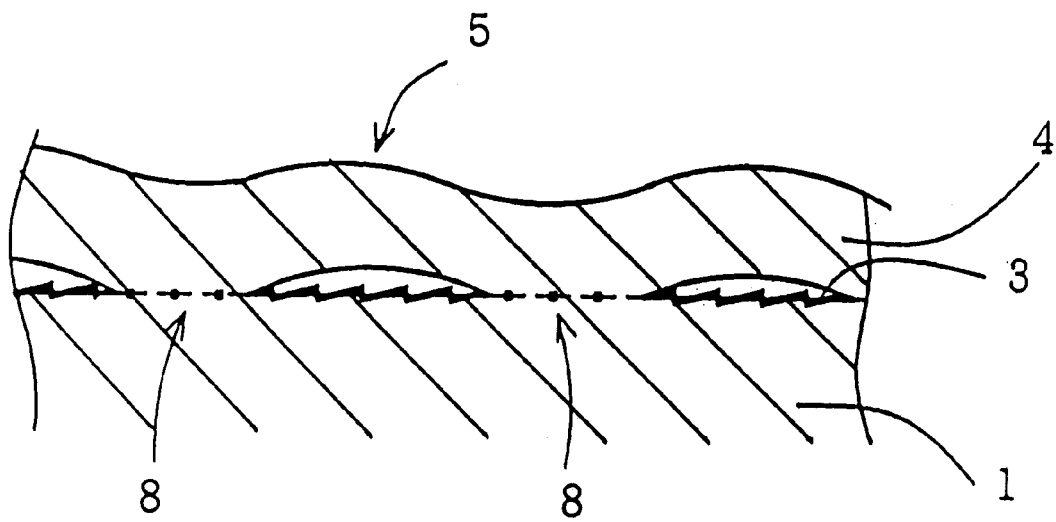
FIG. 4 is an A—A sectional view of FIG. 2.

FIG. 3 and FIG. 4 present the cross-sectional structure expected for the cladding material 10 presented in FIG. 2 (FIG. 3 shows the B—B cross section, and FIG. 4 shows the A—A cross section, respectively). The expanded metal 3 has a small cross section for the current path because of a number of opening formed therein. Furthermore, the contacting area with Ni-foil 2 or that with the metal lining 4 becomes also small, so that large resistance heat generates around the mesh 3. The metal lining 4 consists of Ti or Zr, so that it is softened more easily than the Fe-based metal substrate 1 by resistance heating. Therefore, the expanded metal 3 is to be intruded into the softened metal lining 4 receiving the pressure from the roller electrodes 6, whereby the Fe-based metal substrate 1 and the metal lining 4 are strongly bonded each other. In this case, a small amount of component diffusion layer 11 may be formed in some cases at the part where the metal lining 4 and the metal substrate 1 contact directly each other. As is shown in FIG. 4, the metal substrate 1, the expanded metal 3 and the metal lining 4 are not bonded in the part of the laminate 5 where no seam welded zone is formed.

The total bonding force between the metal lining 4 and the metal substrate 1 over the cladding material 10 can be adjusted by changing the number and/or the width of the seam welded zone 8, or the distance between the seam welded zones 8. The width of the seam welded zone 8 can be adjusted by changing the width of the roller electrodes 6. Furthermore, a seam welded zone 8 with a particularly large width may be obtained by forming a plurality of linear zone juxtaposing or partly overlapping each other.

The metal lining 4 can be constructed with a metal whose main component is the one selected from Nb, Ta and Ni (including the alloys thereof), or with a stainless steel, besides Ti and Zr or the alloys thereof. In this case, the expanded metal can be constructed with a metal whose main component is the one selected from Fe, Ni, Cu, Ag, Ti, Zr (a stainless steel, for example), whereby a strong bonding force is achieved therebetween.

The thickness of the metal lining 4 is adjusted according to the environment where the cladding material 10 is applied. The thickness of the expanded metal 3 (or the diameter of the wire for the mesh 3), mesh opening are adjusted according to the material and the thickness of the metal lining 4 so that the bonding strength is optimized. When the materials and the dimensions for the layers 1, 3, 4 are determined, the condition of the seam welding, such as welding current, pressure from the roller electrodes 6, welding speed (rotation speed of the electrode 6, for example), welding time, and intermission are to be correspondingly determined. For example, the welding current is set so that no melting of the expanded metal 3 due to an excess resistance heat generation, or no bonding imperfection due to a lack of heat generation occurs. On the other hand, the pressure applied to the roller electrodes 6 are adjusted so that the expanded metal 3 is intruded into the metal lining 4 at a proper amount, and no excess intrusion of roller electrodes 6 to the surface of the laminate 5 occurs.

In a case of bonding the metal lining 4 made of Ti or Zr with the metal substrate 1 made of a carbon steel, the thickness T of the metal lining 4 and the thickness M of the metal plate for producing the expanded metal 3 are adjusted so that the ratio M/T is in the range of 0.1–0.6. M/T less than 0.1 may cause an insufficiency of the bonding strength because of a lack of the intrusion of the expanded metal 3 into the metal lining 4. On the other hand, M/T exceeding 0.6 may cause too much intrusion of the expanded metal 3 into the metal lining 4, which leads to an imperfection in the appearance of the cladding material 1 due to a protrusion of expanded metal 3 on the surface of the lining 4, or causes cracks in the lining 4 leading to an insufficiency of the anticorrosion effect thereof against the metal substrate 1. M/T is preferably set in the range of 0.2–0.5.

The size D of the rhombic opening 45, which is defined as the average of the long diagonal line R and the short diagonal line S, i.e., (R+S)/2, is adjusted so that the ratio D/M is in a range of 1.1–40. D/M less than 1.1 may cause an insufficiency of the bonding strength since the size of opening 45 becomes too small, and the intrusion of the expanded metal 3 into the lining 4 becomes insufficient. On the other hand, D/M exceeding 40 may cause an insufficiency of the bonding strength since the intruding amount of the expanded metal 33 into the lining 4 becomes too small. D/M is preferably adjusted in the range of 2–30.

The expanded metal can be constructed by a material which generates a liquid phase partially melting during seam welding, and the metal lining 4 and the metal substrate 1 can be bonded by using this liquid phase according to the soldering effect thereof. More specifically, the expanded metal 3 can be constructed by a metal whose main component is Ni or Cu, and the metal lining 4 can be constructed by a metal whose main component is the one selected from Nb, Ta and Ni, or constructed by a stainless steel. In this case, the values of M/T and D/M is not limited in the aforementioned preferable ranges.

Figure 9:
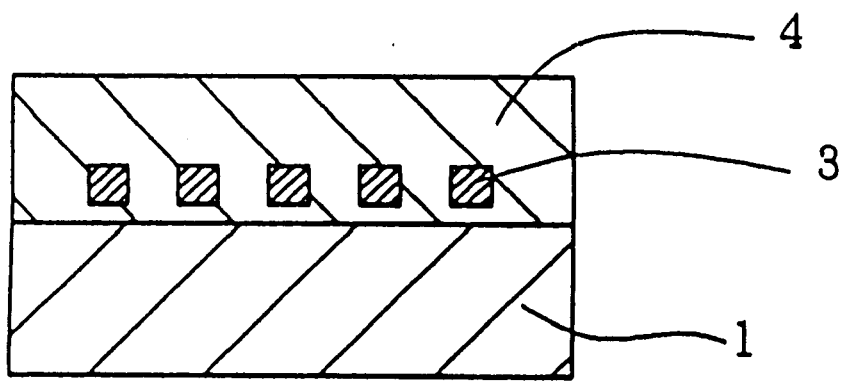
FIG. 9 is a schematic view showing the difference in effects between the configurations using one layer of expanded metal and that using two layers of expanded metals.
Figure 9:
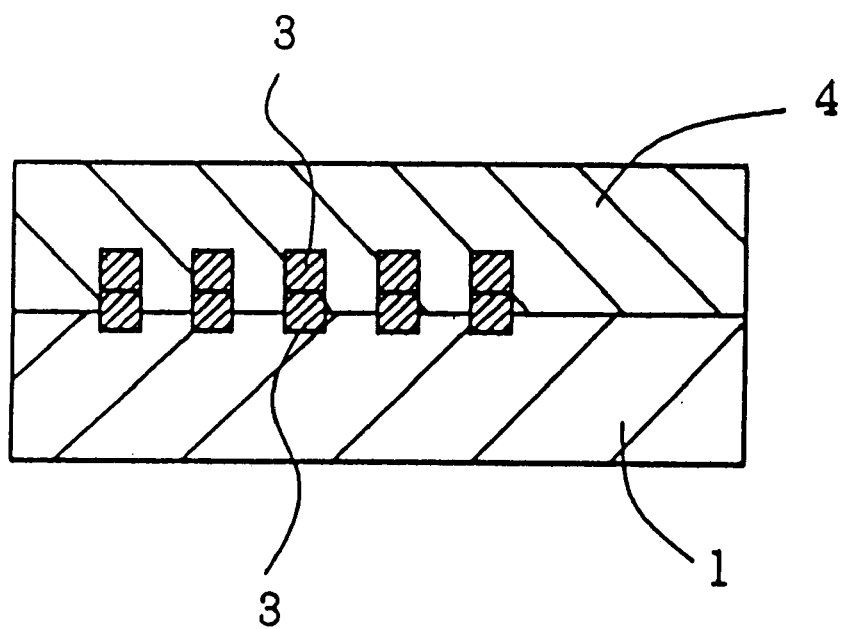

In a case of bonding a particularly thick metal lining 4 with a metal substrate 1 by using a expanded metal 3, a high welding current or a long welding time is needed for securing sufficient welding current density. The expanded metal 3, however, has so small contacting area with the metal lining and so high specific resistivity that the heat generation around the expanded metal 3 becomes too large with increasing the welding current. This may lead to a result that the expanded metal 3 is buried into the metal lining 4 which is softened too much due to an excess heat generation, as shown in FIG. 9 (a), and the bonding effect according to the intrusion of the expanded metal 3 may become insufficient. In this case, as shown in FIG. 9 (b), it is effective to laminate two or more expanded metals 3 since one of the expanded metals 3 may be located between the metal substrate 1 and the metal lining 4 even if the other mesh 3 is buried. In this case, a laminate of expanded metal and a conventional metal mesh produced by metal-wire knitting can be used.

Figure 10:
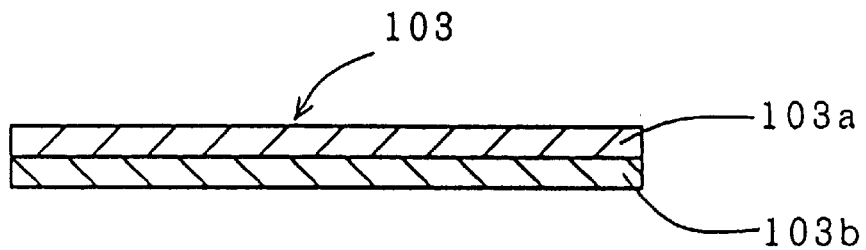
FIG. 10 is a figure presenting an example of an expanded metal produced from a cladding metal sheet along with the function thereof.
Figure 10:
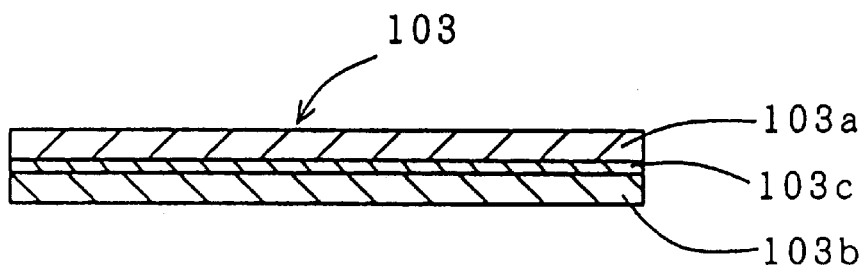
Figure 10:
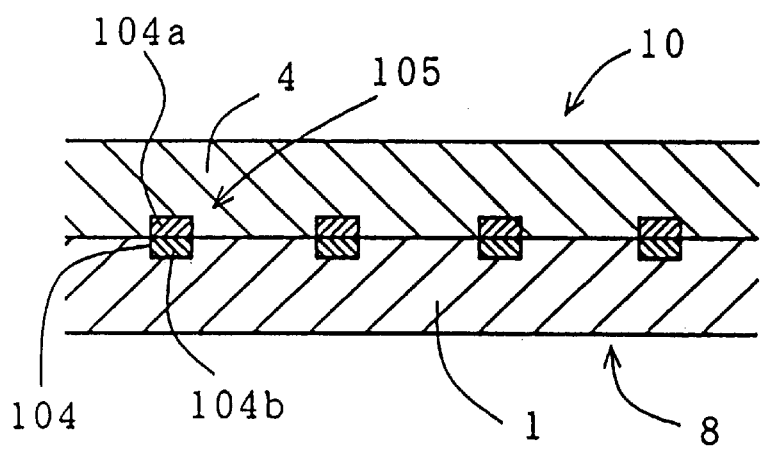

The expanded metal 3 can be produced by using a cladding metal sheet wherein two or more different metal sheets are laminated. FIGS. 10 (a) and (b) presents an example of such cladding metal 103 using two different metal sheets 103a, 103b. Such cladding metal can be produced according to various methods such as of rolling a laminate of metal sheets 103a, 103b, such as of heat treating the laminate for diffusion bonding, or explosion bonding process, and so on. By using such cladding metal sheet instead of the metal plate (or sheet) 35 in FIG. 8, such composite expanded metal 105 as shown in FIG. 10 can be obtained. This expanded metal 105 has a wire-like portion forming the mesh opening which consists of two portions 104a, 104b made of different materials.

FIG. 10 (c) presents an example of the cross-sectional structure of the seam welded zone of a cladding material using the composite expanded metal 105. In this structure, the part 104a is contacting mainly with the metal lining 4, and the part 104b is contacting mainly with the metal substrate 1. A high bonding strength between the metal lining 4 and the metal substrate 1 can be achieved by using a metal having a high affinity with the metal lining 4 for the part 104a, and using a metal having a high affinity with the metal substrate 1 for the part 104b.

Such cladding material can be constructed so that the metal lining 4 consists of a material whose main component is Ti or Zr, the metal substrate consists of Fe-based material such as a carbon steel, the part 104a and 104b of the conposite expanded metal 105 consist of stainless steel (SUS304, SUS316, and so on) and a metal whose main component is Fe, Ni or Cu, respectively.

In a case of using an expanded metal 3 consisting of a single material, the electric resistivity thereof is sometimes too high, and the heat generation from the expanded metal 3 becomes excess. This may cause melting down of the expanded metal 3 or too much softening of the metal lining 4 or the metal substrate 1. In the latter case, the whole part of expanded metal 3 may be buried into the lining 4, and the bonding force between the metal lining 4 and the metal substrate 1 decreases since the intrusion of expanded metal 3 becomes insufficient. In this case, it is effective to use a composite expanded metal 105. The total electric resistivity of the expanded metal 105 may be easily adjusted according to a consideration for a proper combination of materials having different values of resistivity, whereby excellent bonding state is to be achieved since the degree of the intrusion of the expanded metal 105 into the metal lining 4 or the metal substrate 1. A combination of a stainless steel and a metal whose main component is Fe, Ni or Cu can be used as one of the specific example.

In the embodiment using a Fe-based metal substrate 1 and a metal lining 4 consisting of a metal whose main component is the one selected from Ti, Zr, Nb, Ta and Ni, or consisting of a stainless steel, a Ni-based or a Cu-based intermediate metal layer 2 can be inserted between the metal substrate 1 and the expanded metal 3 for increasing the bonding strength of the cladding material.

The intermediate metal layer 2 generates a liquid phase by its own melting, or by melting along with a part of metal substrate 1 or the expanded metal 3 due to the resistance heating.

The liquid phase generated is supplied to the contacting part between the expanded metal 3 and the metal substrate 1. Ni or Cu. the main component of the intermediate metal layer 2, has an excellent wettability or an interdiffusivity against an Fe-based material consisting of the metal substrate 1, so that the bonding force between the expanded metal 3 and the metal substrate 1 is enhanced.

Figure 5:
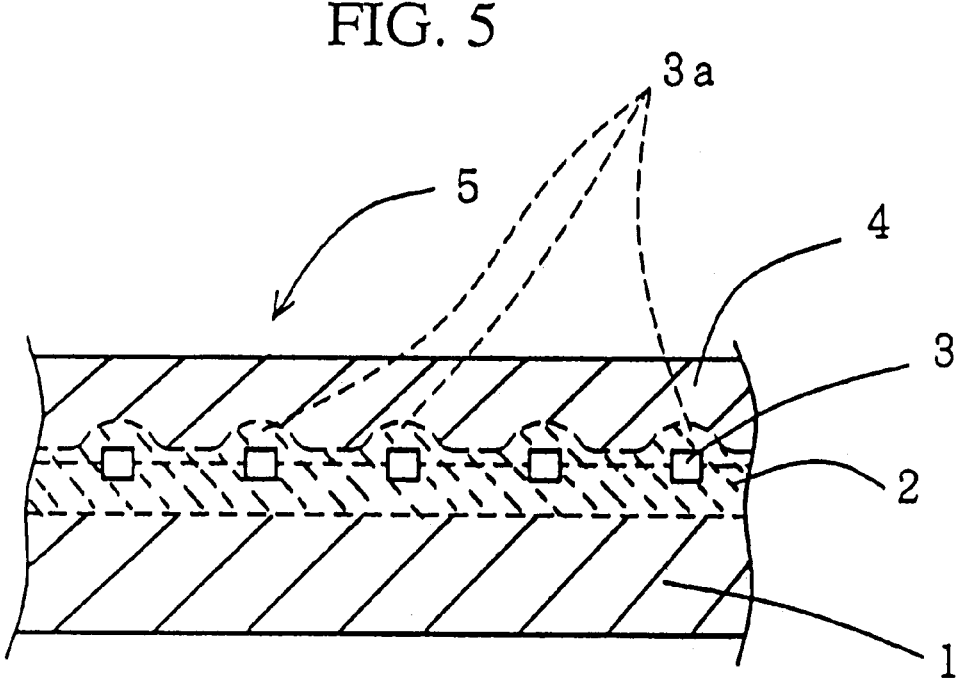
FIG. 5 is a schematic sectional view of the seam welded zone of a cladding material using an expanded metal and an intermediate metal layer.

Thus, as shown in FIG. 5, the metal lining 4 appears to be strongly bonded to the metal substrate 1 due to a multiplication between the intrusion effect of the expanded metal 3 and the brazing and soldering effect of the intermediate metal layer 2. In some cases, a diffusion layer 3a may be formed around the region where the expanded metal 3 is intruded into the metal lining 4 due to a component diffusion therebetween.

The effect is more remarkable when a Ni-based metal is used for the intermediate metal layer 2. Such Ni-based intermediate metal layer 2 may be constituted of a Ni alloy containing at least of Cr, B, Si, C, P, Mo, W, Fe, particularly constituted of an alloy containing Ni as a main component, 5–16 wt % of Cr, 2–4 wt % of B, 3.5–5.5 wt % of Si and 2–5 wt % of Fe. The Ni-based metal layer consisting of such alloy is fused during the seam welding and generates a liquid phase with high flow ability and wettability, so that a cladding material with a high bonding strength can be obtained.

The Ni-based or Cu-based intermediate metal layer 2 may be formed by using a foil of Ni-besed or Cu-based metal. The intermediate metal layer 2 can be also formed as a layer plated on the surface of the metal substrate 1. The plated layer may be formed by various methods, such as electroplating, electroless plating, vacuum evaporation, sputtering. Furthermore, the inter mediate metal layer 2 can be constituted as a powder layer of Ni- or Cu-based metal. The powder layer can be formed by, for example, applying a paste-like mixture of a metal powder and a flux on the surface of the metal substrate. The intermediate metal layer 2 may be formed also by a thermal spraying of a metal powder.

Figure 11:
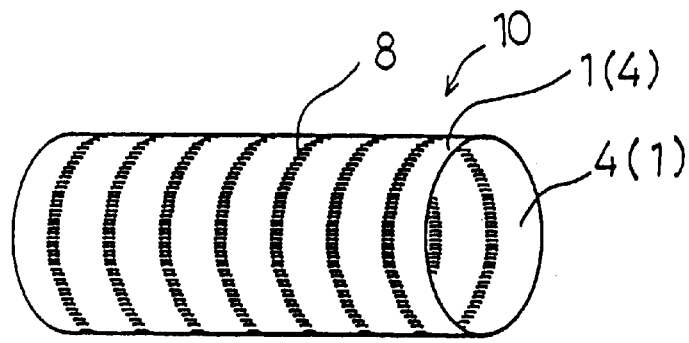
FIG. 11 is a perspective view showing a cladding material wherein the metal substrate is formed in a cylindrical shape.
Figure 11:
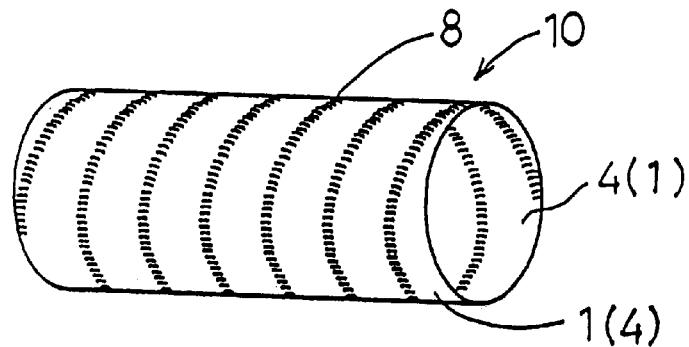
Figure 11:
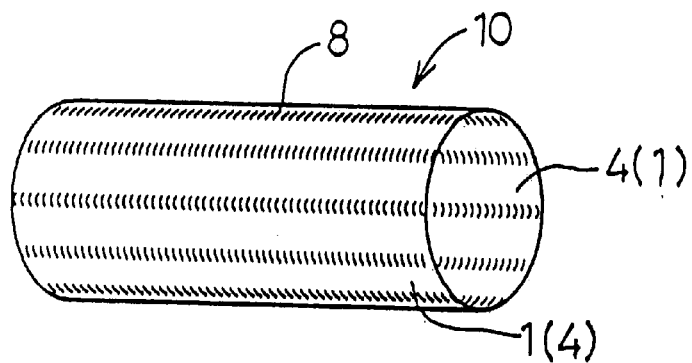

Several embodiments of the cladding materials comprising an Fe-based substrate will now be described in the following. FIG. 11 presents an example of a cladding material 10 wherein the metal substrate 1 is formed in a cylindrical shape. The metal lining 4 covers the inner surface of the cylinder (or the outer surface of the cylinder; in this case, the location of the substrate 1 and the lining 4 is reversed from those presented in FIG. 11). The seam welded zone 8 can be formed in a shape of plural lines along the periphery of the cylinder (FIG. 11 (a)), in a shape of a helical line (FIG. 11 (b)), or in a shape of plural linear lines extending along the axial direction of the cylinder and arranged at a designated distance along the peripheral direction thereof (FIG. 11 (c)). Such shape of the cladding material 10 may be preferably used for shell straight portions of columns and vessels, reactors or heat exchangers, or pipes with corrosion resistive lining inside or outside thereof.

Figure 12:
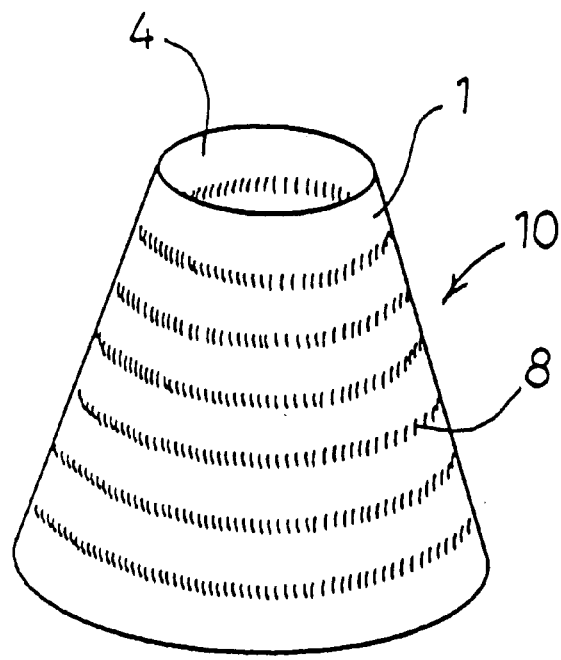
FIG. 12 is a perspective view showing a cladding material wherein the metal substrate is formed in a conical shape.
Figure 12:
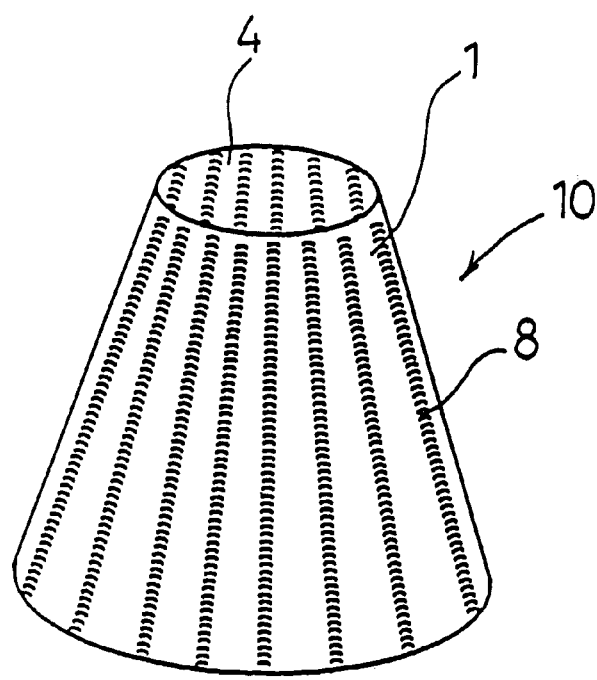

FIG. 12 present an example of a cladding material 10 wherein the metal substrate 1 is formed in a hollow conical or a hollow truncated cone-like shape, and the metal lining 4 covers the inside thereof. The seam welded zone 8 is formed along the peripheral direction (FIG. 12 (a)), or along the generating line thereof (FIG. 12 (b)). Such shape of cladding material is preferably used for a narrower part consisting the upper or lower portions of columns and vessels, or reactors.

Figure 13:
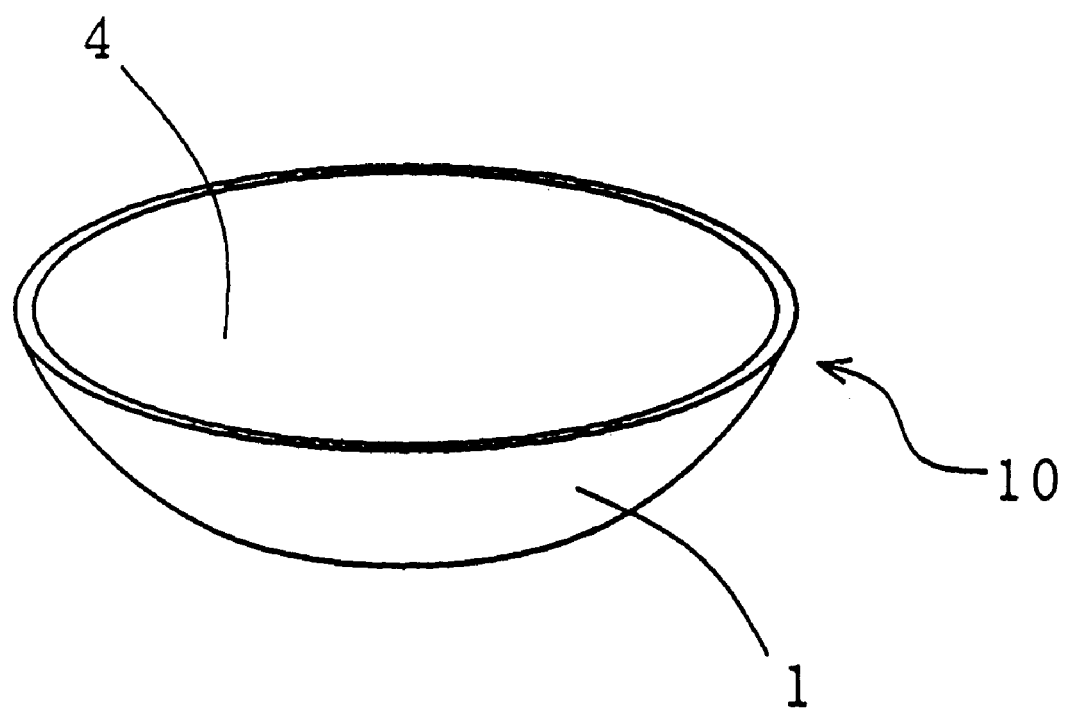
FIG. 13 is a perspective view showing a cladding material wherein the metal substrate is formed in a shape of flat cover.
Figure 14:
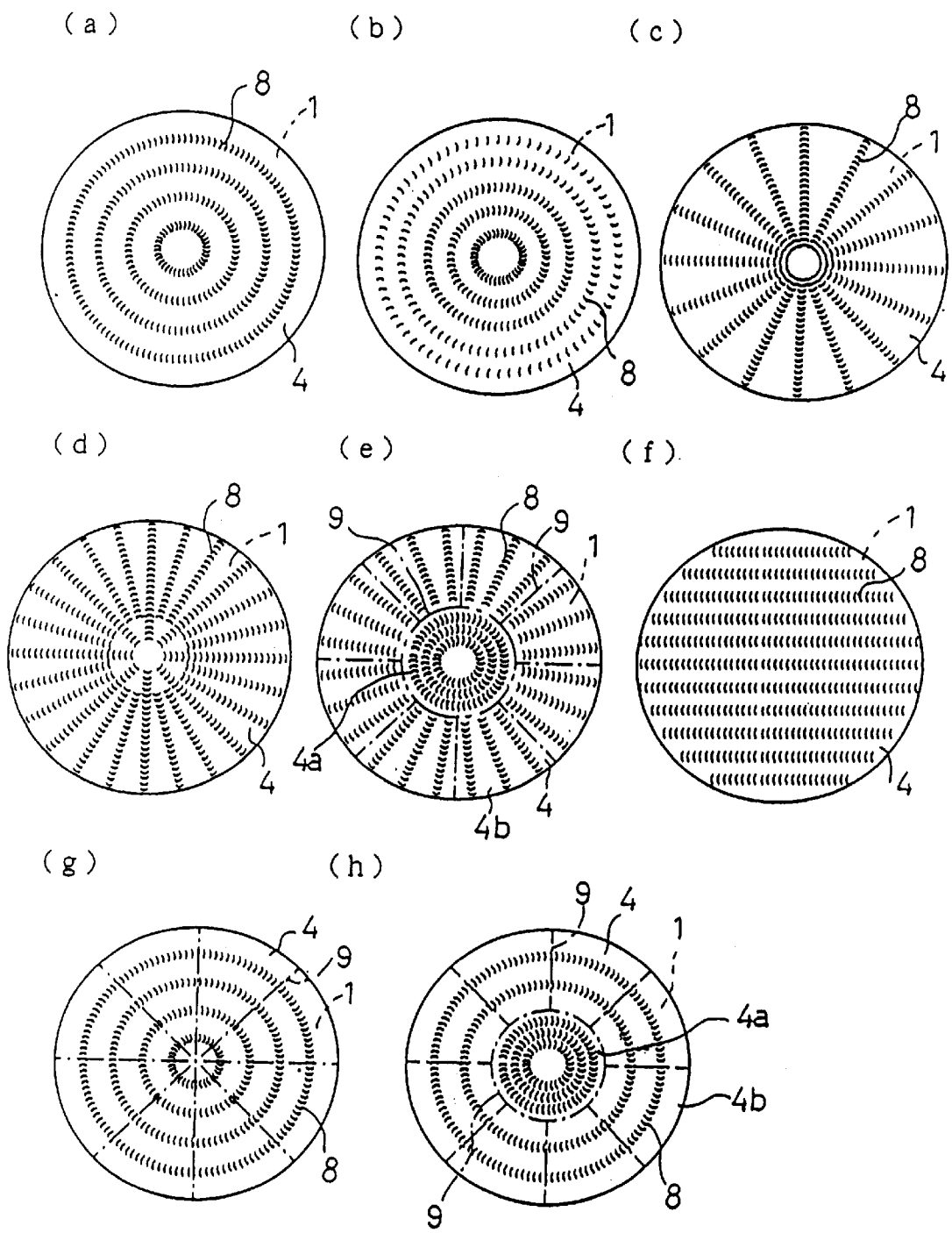
FIG. 14 is a schematic view showing the formation pattern of the seam welded zone for a cladding material in FIG. 13.

In the cladding material presented in FIG. 13, the metal substrate 1 is formed in shape of a flat cover, which has a circular shape in its elevation, and the center portion of which swells outwardly in a shape of a convex curved surface. The inner side (i.e., the concave side) of the substrate 1 is covered with the metal lining 4. Such shape may be preferably used for heads of columns and vessels, or heat exchangers. FIG. 14 presents several examples of the formation pattern of the seam welded zone 8. In FIGS. 14 (a) and (b), the seam welded zone 8 is formed in a shape of uniaxial circles. In FIGS. 14 (c) and (d), the seam welded zone 8 is formed in a shape of radial linear lines. In FIG. 14 (e), the seam welded zone 8 is formed in a shape of a combination of uniaxial circles and radial linear lines. In FIG. 14 (f), the seam welded zone 8 is formed in a shape of a plurality of parallel lines extending along the diameter of the metal substrate 1.

The metal lining 4 can be formed as an integrated portion composed of a plurality of segments arranged so as to cover the whole inner surface of the substrate 1. These segments are welded each other by means of, for example, inert gas shielded tungsten arc welding. FIG. 14 (g) presents an example wherein the metal lining 4 is composed of radially divided segments. The segments are integrated by the joint welded zones 9 formed in the butt portions of the segments, and bonded to the metal substrate 1 by the seam welded zones 8. The seam welded zones 8 are formed in a shape of uniaxial circles so as to evade the joint welded zones 9. In the examples shown in FIGS. 14 (e) and (h), the metal lining 4 is composed of a circular inner segment 4a and a doughnut-like outer segment 4b which is arranged outside of the segment 4a and radially divided into plural segments. Each butt portion between the segments is bonded by corresponding joint welded zones 9. The metal substrate 1 may be divided into an inner portion corresponding to the inner segment 4a of the metal lining 4 and an outer portion corresponding to the outer segment 4b thereof. In this case, the lining segment 4a and 4b can be bonded corresponding inner and outer portions of the substrate 1 by seam welding before integration, respectively. After of all, each portion of the substrate 1 and the lining segment 4a and 4b seam-welded thereto are to be bonded each other by welding, and so on.

Figure 15:
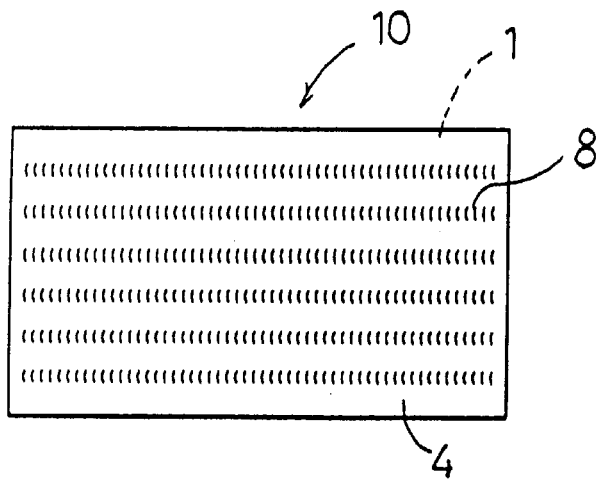
FIG. 15 is a schematic view showing a cladding material wherein the metal substrate is formed in a rectangular plate.
Figure 15:
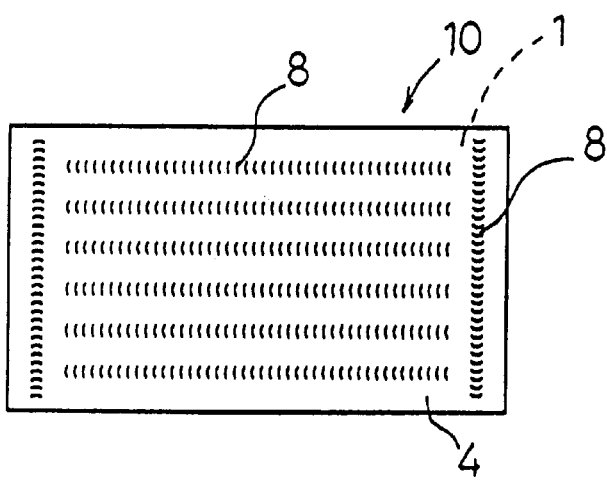
Figure 15:
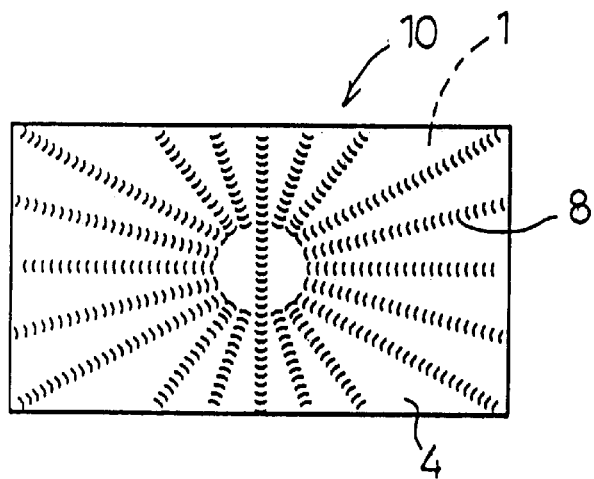
Figure 16:
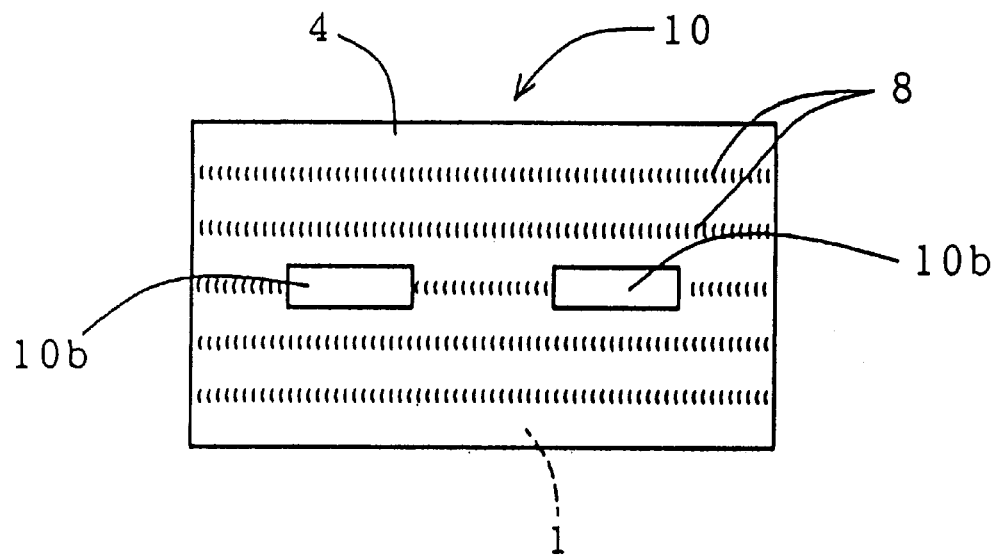
FIG. 16 presents a top view and a side view showing a cladding material wherein the seam welded zone is formed evading protruded portions on the plate-like metal substrate.
Figure 16:
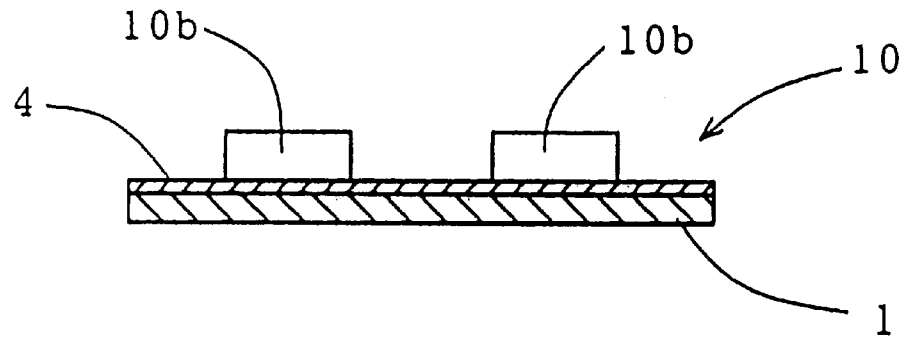

FIG. 15 presents an example of a cladding material wherein the metal substrate 1 is formed in a rectangle plate. In FIG. 15 (a), the seam welded zone 8 is formed in a shape of a plurality of linear lines which extend along one edge of the cladding material 10 and are arranged at a designated distance along the edge intersecting with said one edge. In FIG. 15 (b), additional linear seam welded zones 8 are formed corresponding to both the end of the zones 8. In FIG. 15 (c), the seam welded zones 8 is formed in a shape of a plurality of radial linear lines. Furthermore, when a protruded portion 10b is formed on the metal substrate 1 as shown in FIG. 16, the seam welded zone 8 can be formed so as to evade the portion 10b.

Figure 17:
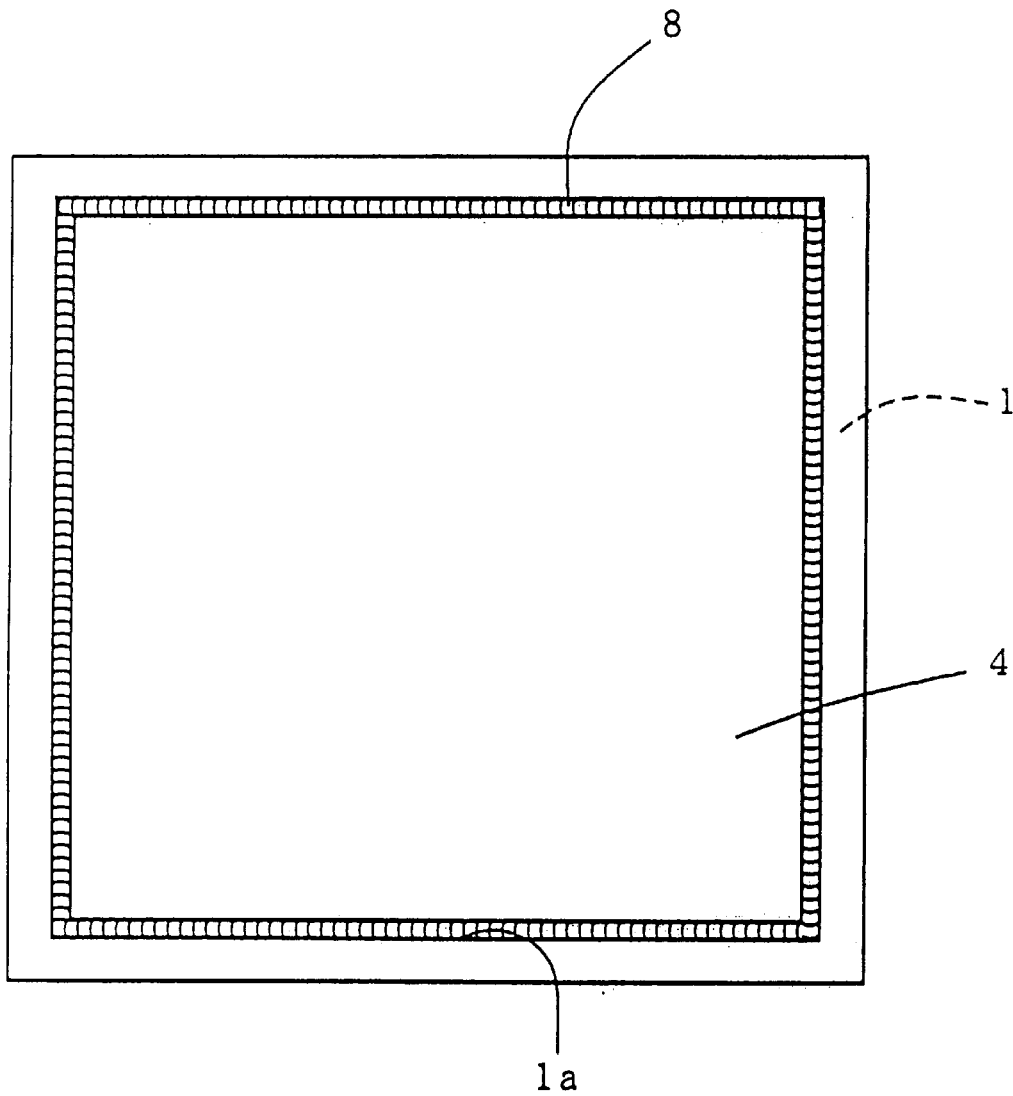
FIG. 17 presents an elevation and a side view showing a cladding material wherein the seam welded zone is formed only in the circumferential region of the metal substrate.
Figure 17:
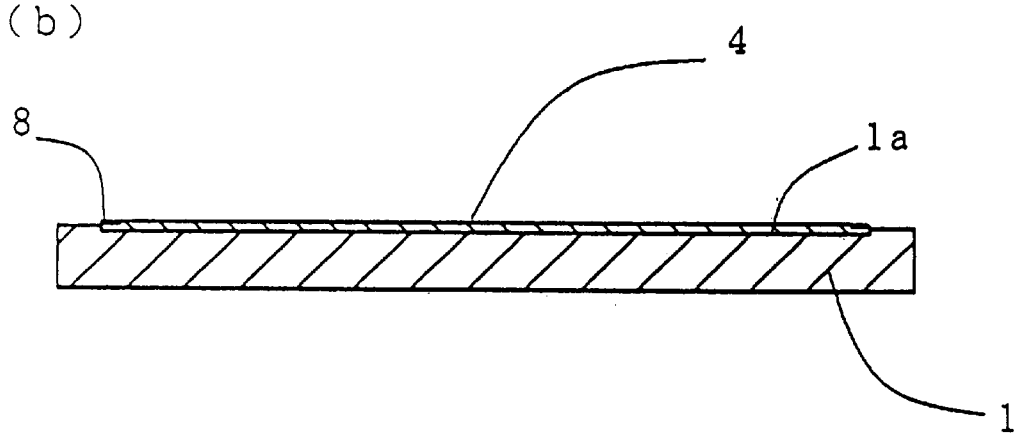
Figure 18:
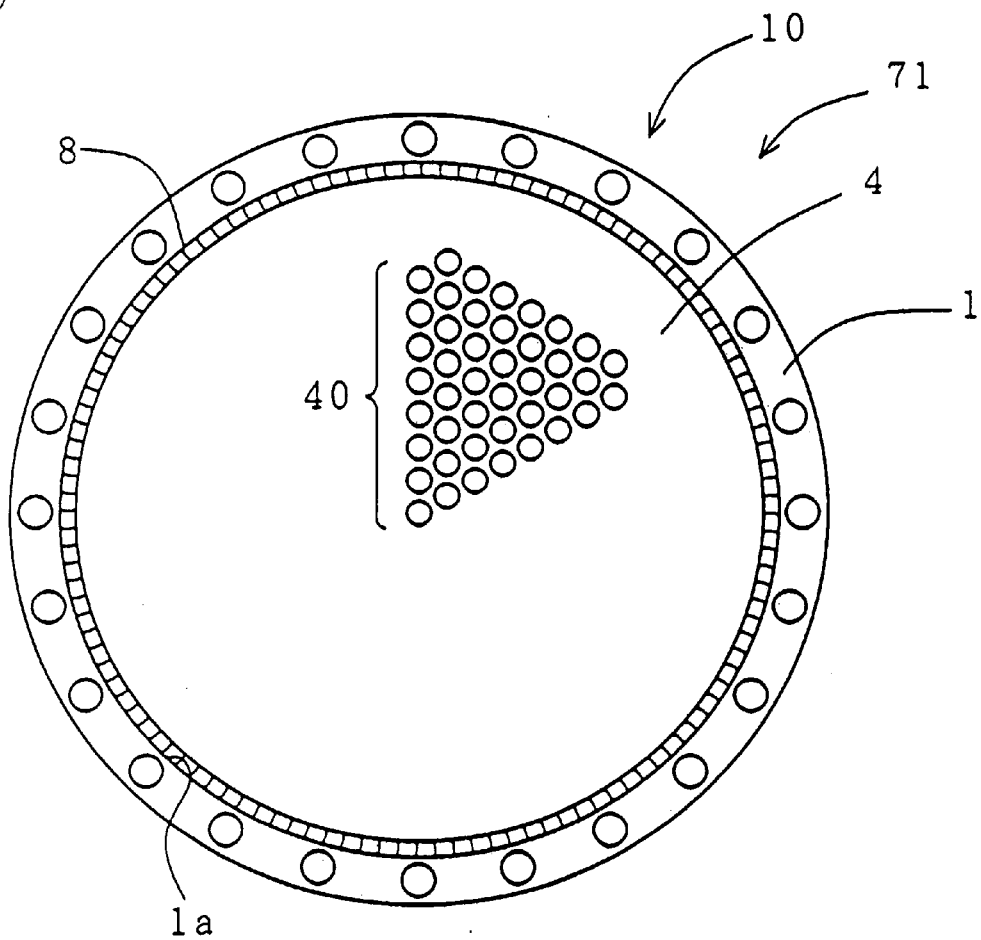
FIG. 18 presents a top view and a side view showing a cladding material wherein many pipes are connected on the metal lining.
Figure 18:
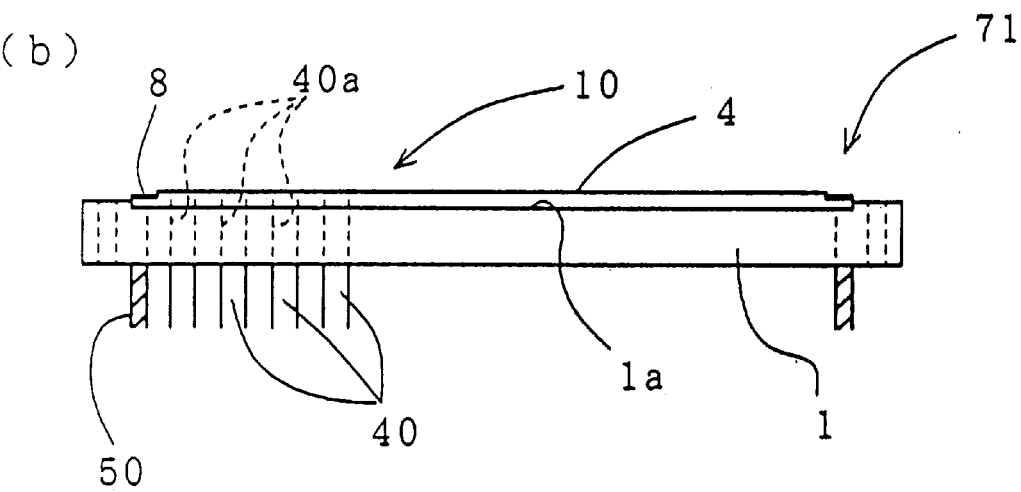

In the cladding material presented in FIG. 17, a plate-like metal lining 4 is engaged to a shallow concave 1a which is formed in a corresponding shape on a thick-plate like metal substrate 1, and a seam welded zone 8 is formed only in the portion along the edge of the metal lining 4. On the other hand, FIG. 18 shows an example that the cladding material 10 is applied to a tube sheet 71 of a heat exchanger. The tube sheet 71 can be produced according to the following method. First of all, many through holes 40a are preliminarily formed in the metal substrate 1 and the metal lining 4, respectively. The metal lining 4 is overlapped on the metal substrate 1, and a seam welded zone 8 is formed in the overlapping portion thereof. Then, the metal substrate 1 is integrated with a cylindrical shell straight portion 50 by means of welding. Finally, pipes 40 are inserted into each through hole 40a so that the end surface of each pipe 40 coincides to that of the metal lining 4, and then the circumferential portion of the pipes 40 are bonded to the metal lining 4 by conventional welding.

Next, several embodiments of the cladding material comprising a Cu-based metal substrate will now be described in the following. The fundamental point of the manufacturing process thereof is, however, based on almost the same principle of that for the cladding material using an Fe-based metal substrate, so that the different point thereof will be mainly described.

Figure 19:
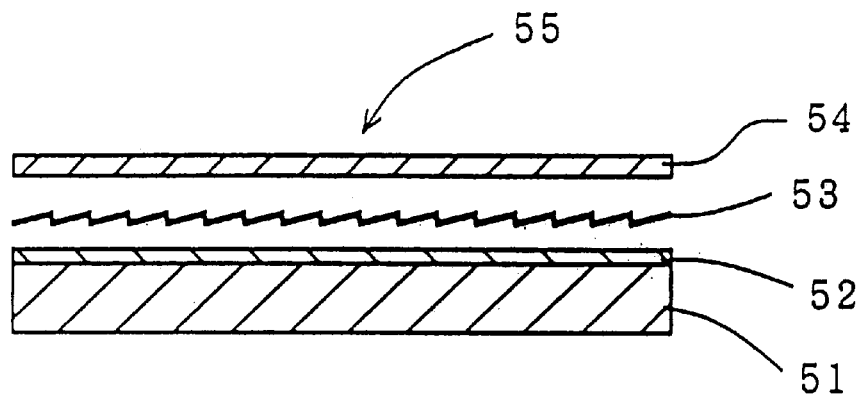
FIG. 19 is a sectional view presenting a first embodiment of the cladding material using a Cu-based metal substrate along with the partial enlarged view of the seam welded zone thereof.
Figure 19:
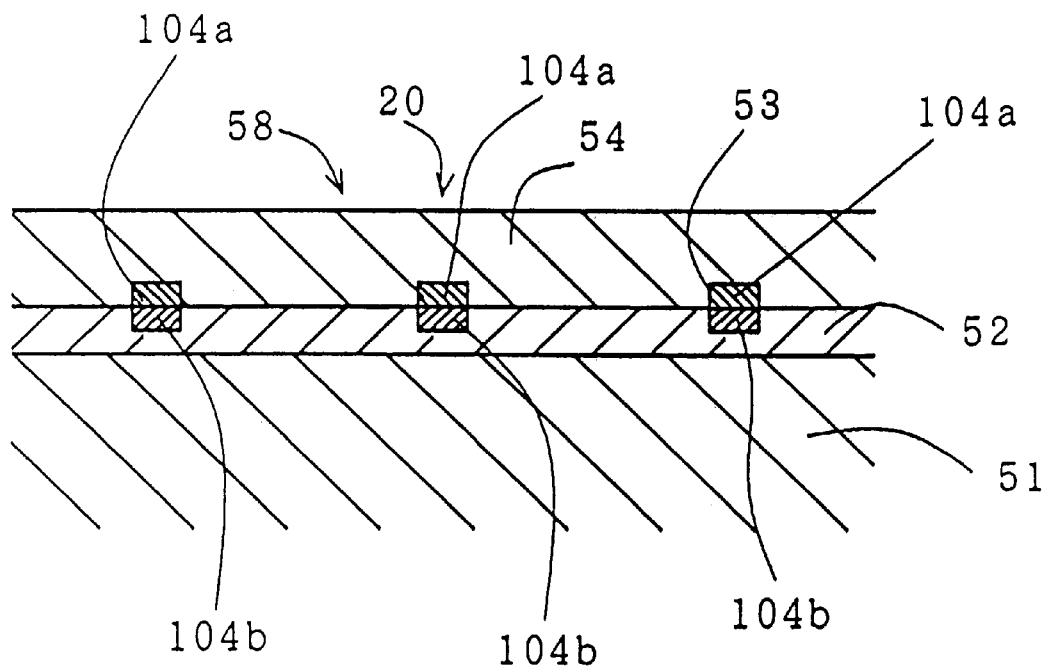

In the embodiment presented in FIG. 19 (a), an intermediate metal layer 52 is formed on the surface of a Cu-based metal substrate 51, an expanded metal 53 and a metal lining 54 consisting of anticorrosive metal, such as Ti, Zr, and so on, is placed thereon, thereby forming a laminate 55. The expanded metal 53 has almost the same construction as the composite expanded material 105 in FIG. 10 (c), wherein the part 104a consists of a stainless steel, and the part 104b consists of Cu.

The intermediate metal layer 52 preferably consists of a material the melting point of which is lower than 1000° C., more preferably lower than 950° C. for securing a sufficient amount of liquid phase during the seam welding. On the other hand, if the melting point is lower than 70° C., only a small increase in the environmental temperature may cause excess softening of the intermediate metal layer 52 which may lead to a drastic decrease in the bonding strength between the metal substrate 1 and the expanded metal 53. Therefore, the melting point of the intermediate metal layer 52 should be higher than 70° C., preferably higher than 100° C.

The expanded metal is a composite one consisting of a stainless steel and Cu, so that by constructing the intermediate metal layer 52 with a material having an excellent wettability against Cu (or Cu alloy), particularly a material containing more than 50 wt % of at least one of components selected from Pb (lead), Sn (tin) and Zn (zinc) in total, the bonding force between the expanded metal 53 and the Cu-based metal substrate may be enhanced. Pb—Sn based alloys (soft solders, for example) are particularly preferable. Following methods may be preferably used for forming such intermediate metal layer on the Cu-based metal substrate; using a foil of metal or alloy, hot dipping method, applying a paste-like mixture of alloy powder and flux.

In the case of using a material containing more than 50 wt % of at least one of components selected from Pb, Sn and Zn in total for the intermediate metal layer, it is preferable to add at least one component selected from In (indium), Ga (gallium), Zn, Ag and Cu to the alloy for adjusting the melting point or the strength of the intermediate metal layer.

Besides the alloys described above, following alloys may be preferably used for the intermediate metal layer;
an alloy containing Ag and Cu more than 50 wt % in total;
an alloy containing more than 70 wt % of Cu and more than 3 wt % of P.

The seam welded zone 58 is assumed to have a structure as presented in FIG. 19 (*b*). The stainless steel portion 104*a* of the expanded metal 53 intrudes relatively largely into the metal lining 54 softened by the resistance heat generation, receiving to the pressure from the roller electrodes 6 (FIG. 1), while the Cu portion 104*b* are bonded to the Cu-based metal substrate 51 by the soft solder layer 52 fused by the heat generation. Thus, the metal lining 54 and the Cu-based metal substrate 51 are to be bonded by the expanded metal 53 and the soft solder layer 52, thereby forming a cladding material 20.

In the case of bonding the metal lining 54 made of Ti or Zr with the Cu-based metal substrate 51, there are also a preferable ranges for the thickness of the metal lining T, the thickness M of the metal plate for producing the expanded metal 53 and the size D of the rhombic opening 45 of the expanded metal 53, i.e., these values are preferably adjusted so that the ratio M/T is in the range of 0.1–0.6, more preferably in the range of 0.2–0.5, and the ratio D/M is in a range of 1–50, more preferably in the range of 2–30.

Figure 20:
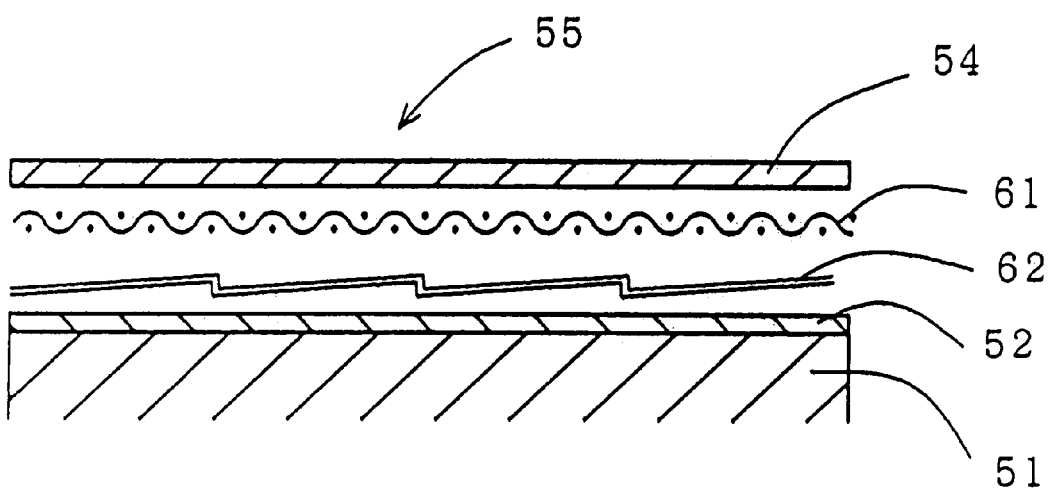
FIG. 20 is a sectional view presenting a second embodiment of the cladding material using a Cu-based metal substrate.

In the embodiment presented in FIG. 20, a Cu-based mesh 61 is arranged contacting with the metal lining 54, and the Ti-based mesh 62 is arranged contacting with the intermediate metal layer 52. The Cu-based mesh 61 is formed as a conventional mesh produced by knitting metal wires while the Ti-based mesh 62 is formed as an expanded metal as shown in FIG. 6. In this case, also the Cu-based mesh 61 can be formed as an expanded metal.

Figure 21:
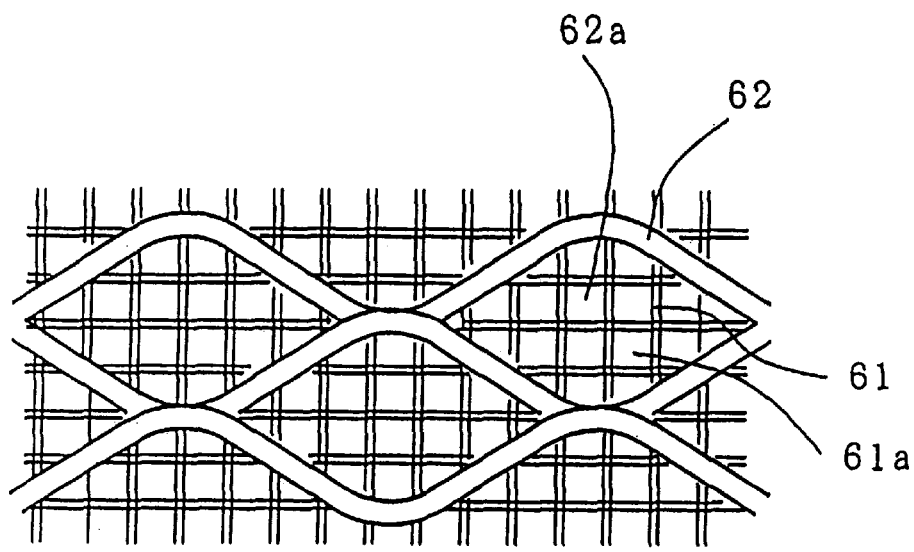
FIG. 21 is an partial enlarged top view presenting the laminating state of the Ti-based mesh and the Cu-based mesh in said second embodiment.
Figure 22:
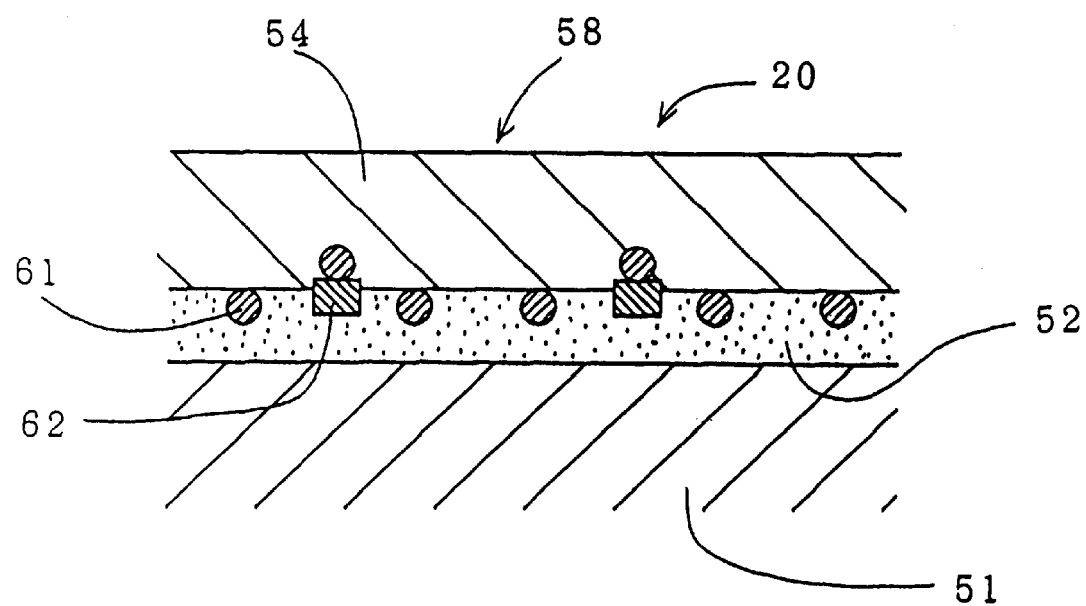
FIG. 22 is a schematic partial enlarged sectional view of the seam welded zone of said second embodiment.

The seam welded zone 58 of such configuration of the cladding material 20 appears to have a structure described as follows. As shown in FIG. 22, the intermediate metal layer 52 fuses due to resistance heating and solders the Cu-based mesh 61 with the metal substrate 51 at the mesh opening 61*a* of the Cu-based mesh 61, while the Ti-based mesh 62 intrudes or is welded to the metal lining 54 at the mesh opening 61*a* of the Cu-based mesh 61, or in some cases along with a part of the Cu-based mesh 61, whereby the metal substrate 51 is bonded to the metal linin 54. Since the metal lining 54 consists of Ti or Zr, a component diffusion between the lining 54 and the Ti-based mesh 62 appears to proceed extensively thereby enhancing the bonding force therebetween. As shown in FIG. 21, for enhancing the bonding force between the Cu-based mesh 61 and the metal substrate 51 through the intermediate metal layer 52, the mesh spacing of the Ti-based mesh 62 is preferably set to be larger than that of the Cu-based mesh 61. In this case, for accomplishing a further excellent bonding state, the ration D/H, where D (=(R+S)/2) is the mesh spacing of the Ti-based mesh 62, and H is the mesh spacing of the Cu-based mesh 61, i.e., the inter-wire spacing for the adjacent wires of the mesh, is preferably adjusted in the range of 5–15, more preferably in the range of 8–12.

Several embodiments of the cladding materials comprising a Cu-based substrate will now be described in the following. In the cladding material 20 presented in FIG. 23 (*a*), the metal substrate 51 comprises a main body 51*a* formed in an elongated rectangle shape, supporting portions 51*b* which protrude upwardly from each end portion of the main body 51*a*, and a projecting portion 51*c* which project outwardly from the upper end part of each supporting portions 51*b*. Whole surface of the portions 51*a*–51*c* are covered with a metal lining 54 consisting of an anticorrosive metal, such as Ti, Zr, and so on, and seam welded zones 58 are formed on the main body 51*a* and on the projecting portions 51*c*.

Figure 23:
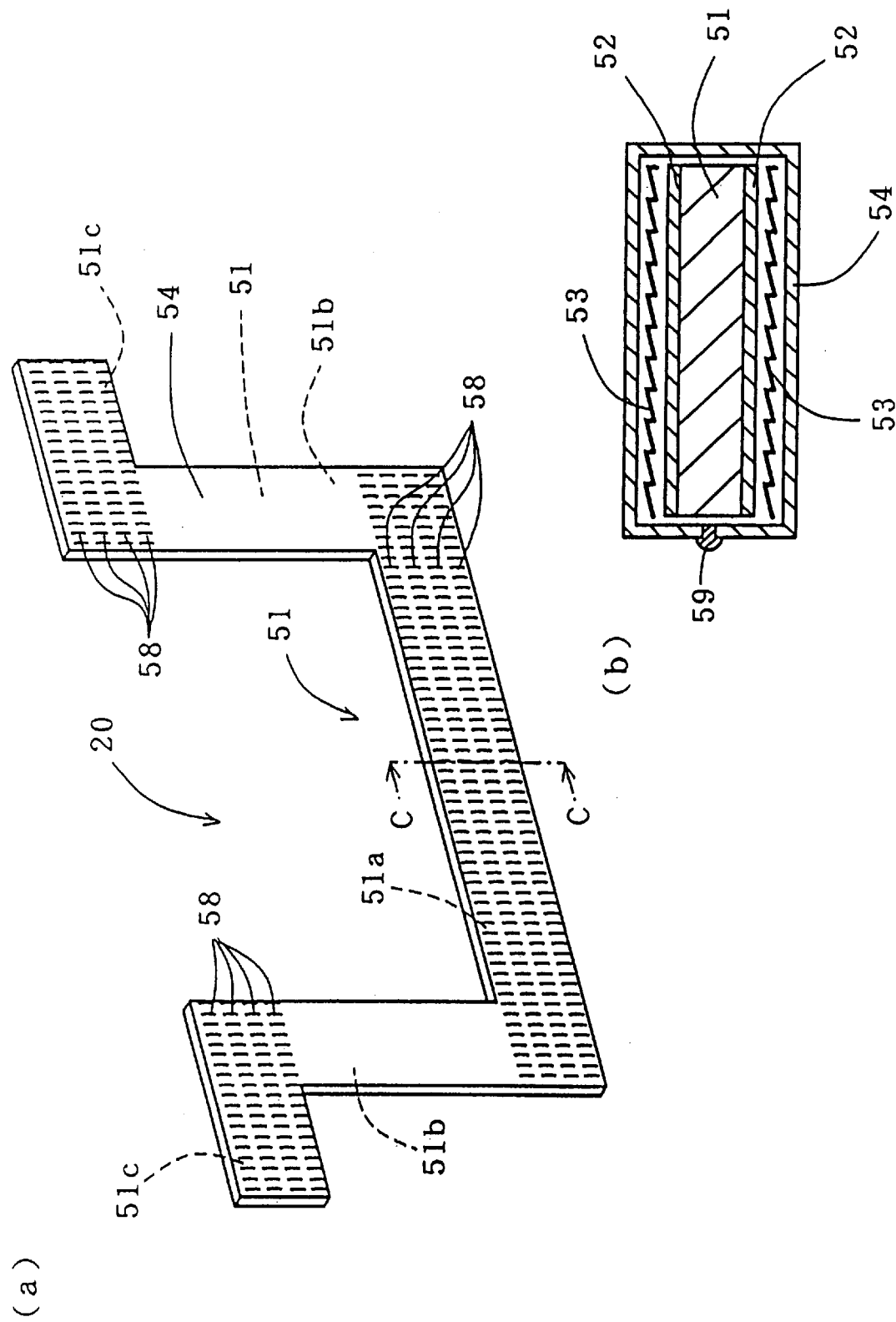
FIG. 23 is a perspective view of a specific appliance of the cladding material using a Cu-based metal substrate and the C—C sectional view thereof.

FIG. 23 (*b*) presents the sectional view of the main body 51*a* of the cladding material 20. The soft solder layers 52 are formed on both sides of the metal substrate 51, the metal meshes 53 (or an laminate of a Cu-based mesh 61 and a Ti-based mesh 62 as shown in FIG. 22) are placed thereon, and whole of the laminate is covered with the metal lining 54. Both ends of the metal lining 54 are bonded by the welded portion 59 at one edge side of the metal substrate 51 so as to wrapping it. By performing seam welding in this state, seam welded zones 58 are to be formed simultaneously on both sides of the metal substrate 51. The seam welded zone 58 is formed in a shape of plural lines arranged at a designated intervals, and each plural lines extends along the longitudinal direction of the main body 51*a*, and along the projecting direction of the projecting portion 51*c*. Such cladding material 20 is preferably used as an electrode for electroplating or various electrolytical treatment, or as a bus bar for current feeding.

More specifically, the cladding material 20 in FIG. 22 is preferably used as a submerged bus bar wherein the projecting portions 51*c* are positioned out of the electrolysis and used as terminal portions for current feeding, and wherein the main body 51*a* is immersed under the electrolysis and used as a supporting part which supports objects to be plated or anode baskets for accommodating the plating material in a suspended state.

Figure 24:
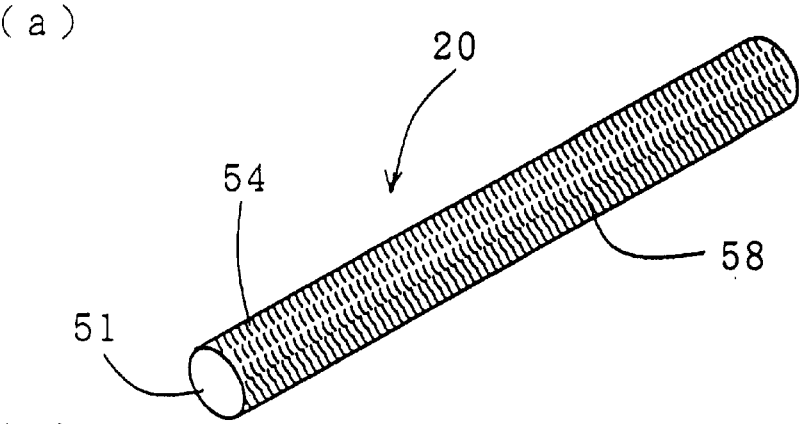
FIG. 24 is a perspective view of another specific appliance of the cladding material using a Cu-based.
Figure 24:
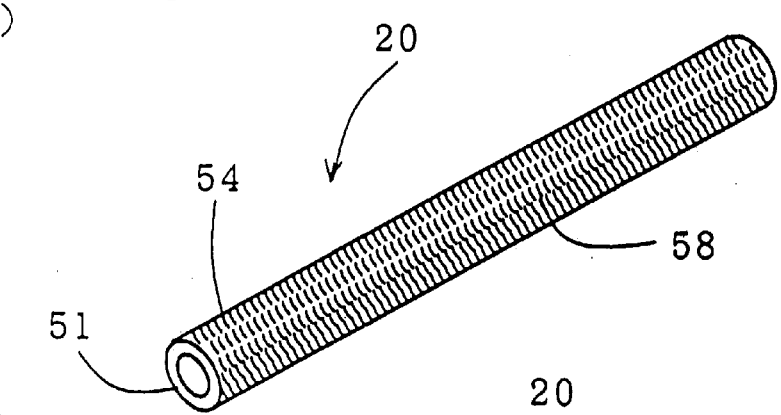
Figure 24:
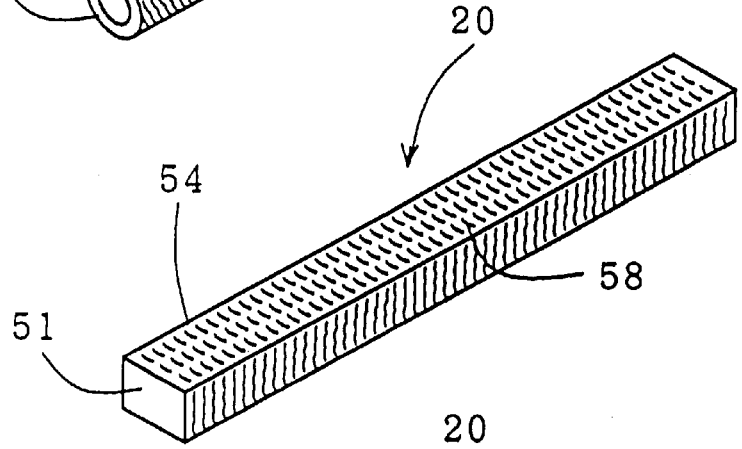
Figure 24:
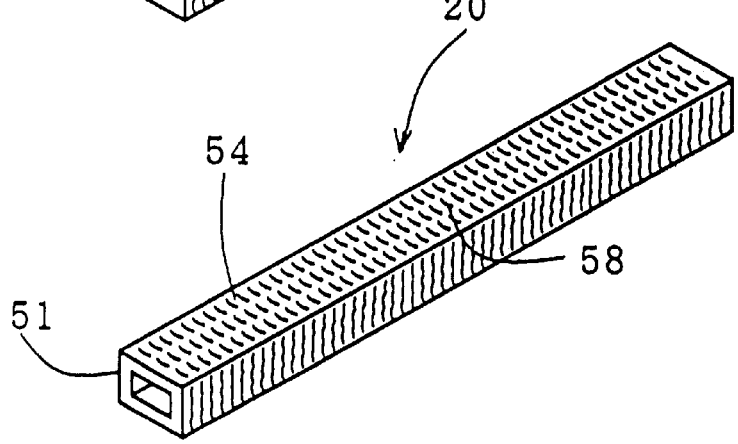

As is shown in FIGS. 24 (*a*)–(*d*), the metal substrate 51 can be formed in a rod or a bar with a circular or a square cross section. The metal lining 54 covers the outer surface of the substrate 51. The seam welded zones 58 are formed in a shape of plural linear lines extending along the longitudinal direction of the substrate 51 and arranged at a designated interval along the periphery thereof. In FIGS. 23 (*b*) and (*d*), the metal substrate 51 has a hollow structure. These embodiments are also preferably used for base bodies of electrodes or submerged bus bars (Experiment 1)

Plate-like Fe-based and Al-based metal substrates were prepared so as to have a dimension of 50 cm×50 cm×12 mm, and metal meshes (diameter of wire: 0.1 to 0.6 mm, size of rhombic mesh opening thereof: 6.0 mm for the long diagonal line R and 3.2 mm for the short diagonal line S (FIG. 6)), and corrosion resistant metal plates (i.e., metal lining; thickness: 0.5 to 1.5 mm), each of which has the same area as the metal substrate, were laminated thereon. Then, a plurality of linear seam welded zones are formed along the longitudinal direction of the metal substrate with an interval of 25 mm according to the method shown in FIG. 1 for producing cladding materials (Table 1: sample No.1 to 14, Table 2: sample No.60 to 65). And for some samples various kinds of metal foils (thickness: 10 to 100 $\mu$m) were laminated between the metal substrates and the corrosion resistant metal plates as an intermediate metal layer (Sample No. 12 to 14). As reference samples, cladding materials comprising no metal mesh and metal foil are prepared. In these materials, the corrosion resistant metal plate is directly placed on the metal substrate, and seam welding is subsequently performed thereto (Table 1: sample No.20 to 25, Table 2: sample No.66 to 71).

Materials used are described in the following. Metal substrate: carbon steel (SS400), stainless steel (SUS304), aluminum (A1070P);

Corrosion resistant metal plate: Ti, Zr, Nb, Ta, Ti—Pd (palladium) alloy (Ti-0.15 wt %Pd), stainless steel (SUS304), Ni alloy (Hastelloy C-276, Ni-5 wt %Fe-16 wt %Cr-16 wt %Mo);

Expanded metal mesh: stainless steel (SUS304), composite mesh (of Ni, Ag, and stainless steel (SUS304) and carbon steel), composite mesh (of stainless steel (SUS304) and Ni);

Metal foil: Ni, Cu.

Condition of seam welding is controlled in the following range:

Electric current: 5000 to 25000 A;
Welding time: 5 to 50 cycle;
Intermission: 5 to 50 cycle;
Pressure: 500 to 1500 kg;
Width of electrode: 5 to 20 mm;
Speed of welding: 500 to 1500 mm/min.

Bend test was performed for each cladding material under a condition wherein the inner diameter of bending was twice of the cladding material's thickness, and bending angle was 180°. The bonding condition between the corrosion resistant metal plate and the metal substrate was judged whether the bonded part is peeled off or not. The results are presented in Tables 1–2.

The cladding materials of this invention showed good bonding conditions while the bonded parts of all comparative samples were peeled off.

(Experiment 2)

Intermediate metal layers (thickness: 10 to 100 μm), metal meshes and corrosion resistant metal plates (thickness: 0.5 to 1.5 mm) are laminated in this order on copper-based metal substrates with a dimension of 5 cm×100 cm×6 mm. Then, a plurality of linear seam welded zones extending along the longitudinal direction of the metal substrate are formed so as to be juxtaposed closely each other according to the method shown in FIG. 1 for producing cladding materials (Table 3: sample No.31 to 44). As reference samples, a cladding material comprising no metal mesh (Table 3: sample No.45), or that comprising no metal mesh and no intermediate metal layer (Table 3: sample No.46 to 50) were also prepared.

Materials used are described in the following:

Metal substrate: oxygen-free copper;
Corrosion resistant metal plate: Ti, Zr, Nb, Ta, stainless steel (SUS304) and Ni;
Metal mesh: composite mesh (wherein lengthwise wires consists of stainless steel (SUS304), breadthwise wires consists of Cu, diameter of the wires is 0.1–0.5 mm, and the mesh space is 16–100 mesh), composite mesh (wherein lengthwise wires consists of Ni, breadthwise wires consists of Cu, diameter of the wires is 0.1–0.5 mm, and the mesh space is 16–100 mesh);
Intermediate metal layer: soft solder (Sn-37 wt %Pb, Sn-47 wt %Pb-3 wt %Cu, and Sn-50 wt %Pb, each of which was fused and applied to the metal substrate).

Condition of seam welding is controlled in the following range:

Electric current: 5000 to 25000 A;
Welding Time: 5 to 50 cycle;
Intermission: 5 to 50 cycle;
Pressure: 500 to 1500 kg;
Width of electrode: 5 to 20 mm;
Speed of welding: 500 to 1500 mm/min.

Bend test was performed for each cladding material under a condition wherein the inner diameter of bending was twice of the cladding material's thickness, and bending angle was 180°. The bonding condition between the corrosion resistant metal plate and the metal substrate was judged whether the bonded part is peeled off or not. The results are presented in Table 3.

The cladding materials of this invention showed good bonding conditions while the bonded parts of all comparative samples were peeled off.

TABLE 1

|  | No. | Metal Substrate | Corrosion Resistant Metal Plate | Metal Net | Metal Layer | Peeling Off |
|---|---|---|---|---|---|---|
| Practical Examples | 1 | SS400 | Ti | SUS304 | — | No |
|  | 2 | SS400 | Ti-0.15 wt % Pd | SUS304 | — | No |
|  | 3 | SUS304 | Ti | SUS304/Ni composite | — | No |
|  | 4 | SUS304 | Nb | Cu | — | No |
|  | 5 | SS400 | Ti | SUS304/Carbon steel composite | — | No |
|  | 6 | SS400 | Zr | SUS304/Carbon steel composite | — | No |
|  | 7 | SS400 | Nb | Ni | — | No |
|  | 8 | SS400 | Nb | SUS304 | — | No |
|  | 9 | SS400 | Ta | Ni | — | No |
|  | 10 | SS400 | SUS304 | Ni | — | No |
|  | 11 | SUS304 | Hastelloy C276 | Ni | — | No |
|  | 12 | SS400 | Ti | SUS304 | Ni foil | No |
|  | 13 | SUS304 | Ti | SUS304/Carbon steel composite | Cu foil | No |
|  | 14 | SUS304 | Zr | SUS304 | Ni foil | No |
| Comparative Examples | 20 | SS400 | Ti | — | — | Yes |
|  | 21 | SUS304 | Zr | — | — | Yes |
|  | 22 | SS400 | Nb | — | — | Yes |
|  | 23 | SUS304 | Ta | — | — | Yes |
|  | 24 | SUS304 | Ni | — | — | Yes |
|  | 25 | SS400 | SUS304 | — | — | Yes |

TABLE 2

| | No. | Metal Substrate | Corrosion Resistant Metal Plate | Metal Net | Metal Layer | Peeling Off |
|---|---|---|---|---|---|---|
| Practical Examples | 60 | Al | Ti | SUS304 | — | No |
| | 61 | Al | Zr | SUS304 | — | No |
| | 62 | Al | Nb | SUS304/Ni composite | — | No |
| | 63 | Al | Ta | SUS304/Ni composite | — | No |
| | 64 | Al | Ni | SUS304 | — | No |
| | 65 | Al | SUS304 | SUS304/Ni composite | — | No |
| Comparative Examples | 66 | Al | Ti | — | — | Yes |
| | 67 | Al | Zr | — | — | Yes |
| | 68 | Al | Nb | — | — | Yes |
| | 69 | Al | Ta | — | — | Yes |
| | 70 | Al | Ni | — | — | Yes |
| | 71 | Al | SUS304 | — | — | Yes |

TABLE 3

| | No. | Metal Substrate | Corrosion Resistant Metal Plate | Metal Net | Metal Layer | Peeling Off |
|---|---|---|---|---|---|---|
| Practical Examples | 31 | Cu | Ti | Expanded metal using SUS304/Cu clad | Sn-37 wt % Pb | No |
| | 32 | Cu | Ti | Expanded metal using SUS304/Cu clad | Sn-47 wt % Pb-3 wt %-Cu | No |
| | 33 | Cu | Ti | Expanded metal using SUS304/Cu clad | Sn-50 wt % Pb | No |
| | 34 | Cu | Zr | Expanded metal using SUS304/Cu clad | Sn-37 wt % Pb | No |
| | 35 | Cu | Nb | Expanded metal using SUS304/Cu clad | Sn-37 wt % Pb | No |
| | 36 | Cu | Ta | Expanded metal using SUS304/Cu clad | Sn-37 wt % Pb | No |
| | 37 | Cu | Ni | Expanded metal using SUS304/Cu clad | Sn-37 wt % Pb | No |
| | 38 | Cu | SUS304 | Expanded metal using SUS304/Cu clad | Sn-37 wt % Pb | No |
| | 39 | Cu | Ti | Ti Expanded metal, Cu net | Sn-37 wt % Pb | No |
| | 40 | Cu | Ti | Cu net, Ti Expanded metal, Cu net | Sn-37 wt % Pb | No |
| | 41 | Cu | Zr | Ti Expanded metal, Cu net | Sn-37 wt % Pb | No |
| | 42 | Cu | Nb | Ti Expanded metal, Cu net | Sn-37 wt % Pb | No |
| | 43 | Cu | Ta | Ti Expanded metal, Cu net | Sn-37 wt % Pb | No |
| | 44 | Cu | Ni | Ti Expanded metal, Cu net | Sn-37 wt % Pb | No |
| Comparative Examples | 45 | Cu | Ti | — | Sn-37 wt % Pb | Yes |
| | 46 | Cu | Ti | — | — | Yes |
| | 47 | Cu | Zr | — | — | Yes |
| | 48 | Cu | Nb | — | — | Yes |
| | 49 | Cu | Ta | — | — | Yes |
| | 50 | Cu | Ni | — | — | Yes |

What is claimed is:

1. A cladding material comprising:
a metal substrate consisting of a metal whose main component is Fe or Cu;
a metal mesh layer placed on said metal substrate comprising an expanded metal whose openings are formed by making staggered cuts in a metal plate over the whole part thereof so that each cut passes through the thickness of said metal plate, and expanding said metal plate in a direction intersecting the length of said cuts thereby opening each cut;
a metal lining which is placed in contact with said metal mesh in opposition to said metal substrate with said metal mesh in between and consisting of a metal whose main component is the one selected from the group consisting of Ti, Zr, Nb, Ta and Ni, or consisting of a stainless steel; and
a resistance welded zone which bonds said metal substrate, said metal mesh layer and said metal lining together.

2. The cladding material according to claim 1 wherein said metal plate used for said expanded metal is a cladding material consisting of two or more metal sheets laminated each other.

3. The cladding material according to claim 1 wherein said metal mesh layer comprises two or more metal meshes at least one of which is said expanded metal mesh.

4. The cladding material according to claim 1 wherein an intermediate metal layer is inserted between said metal substrate and said metal mesh layer.

5. The cladding material according to claim 1 wherein said metal mesh layer comprises said expanded metal consisting of a metal whose main component is the one selected from the group consisting of Fe, Ni, Cu, Ag, Ti and Zr.

6. The cladding material according to claim 1, wherein the thickness M of the metal plate for producing the thickness T of the metal lining are adjusted so that the ratio M/T is in the range of 0.1–0.6.

7. The cladding material according to claim 6 wherein said ratio M/T is adjusted in the range of 0.2–0.5.

8. The cladding material according to claim 6 wherein the size D of the rhombic opening of said expanded metal, which is defined as the average of the long diagonal line R and the short diagonal line S, the thickness M of the metal plate for producing the expanded metal, is adjusted so that the ratio D/M is in a range of 1.1–40.

9. The cladding material according to claim 8 wherein said ratio D/M is adjusted in the range of 2–30.

10. The cladding material according to claim 1, wherein said metal lining consists of a metal whose main component is Ti or Zr, wherein said metal substrate consists of a metal whose main component is Fe, and wherein said metal plate used for said expanded metal is a stainless steel.

11. The cladding material according to claim 1, wherein said metal lining consists of a metal whose main component is the one selected from the group consisting of Nb, Ta and Ni, wherein said metal substrate consists of a metal whose main component is Fe, and wherein said metal plate used for said expanded metal consists of a metal whose main component is Ni or Cu.

12. A cladding material comprising:
- a metal substrate consisting of a metal whose main component is Fe or Cu;
- a metal mesh layer placed on said metal substrate comprising an expanded metal whose openings are formed by making staggered cuts in a metal plate over the whole part thereof so that each cut passes through the thickness of said metal plate, and expanding said metal plate in a direction intersecting the length of said cuts thereby opening each cut;
- a metal lining which is placed in contact with said metal mesh in opposition to said metal substrate with said metal mesh in between and consisting of a metal whose main component is the one selected from Ti, Zr, Nb, Ta and Ni, or consisting of a stainless steel;
- a resistance welded zone which bonds said metal substrate, said metal mesh layer and said metal lining together,
- wherein said metal plate used for said expanded metal is a cladding material consisting of two different metal sheets laminated each other, and the expanded metal is a composite metal which has a wire portion forming the mesh opening which consists of two portions made of different materials,
- and wherein the expanded metal is bonded at the resistance welded zone so that the one part of said two portions is contacting mainly with the metal lining, and the other part is contacting mainly with the metal substrate.

13. The cladding material according to claim 12, wherein said two metal plates used for said expanded metal is produced from a cladding material consisting of two materials of different electric resistivities so as to adjust the total electric resistivity of the expanded metal when the resistance welded zone is formed.

14. The cladding material according to claim 12, wherein said metal lining consists of a metal whose main component is Ti or Zr, wherein said metal substrate consists of a metal whose main component is Fe, and wherein said metal plate used for said expanded metal is a cladding material consisting of a stainless steel and a carbon steel.

15. The cladding material according to claim 12, wherein said corrosion resistant metal lining consists of a metal whose main component is Ti or Zr, wherein said metal substrate consists of a metal whose main component is Fe, and wherein said metal plate used for said expanded metal is a cladding material consisting of a stainless steel and Ni.

16. The cladding material according to claim 12, wherein said metal substrate consists of a metal, a metal whose main component is Cu, wherein said metal plate used for said expanded metal is a cladding material consisting of a stainless steel and Cu and wherein an intermediate metal layer consisting of a metal whose melting point is lower than the metal used for the metal substrate is inserted between said metal substrate and said metal mesh layer.

* * * * *